United States Patent [19]
Crawford, Jr. et al.

[11] Patent Number: 5,768,480
[45] Date of Patent: Jun. 16, 1998

[54] INTEGRATING RULES INTO OBJECT-ORIENTED PROGRAMMING SYSTEMS

[75] Inventors: James Melton Crawford, Jr., Eugene, Oreg.; Daniel L. Dvorak, Lincroft, N.J.; Diane Judith Litman, Maplewood, N.J.; Anil K. Mishra, Edison, N.J.; Peter Frederick Patel-Schneider, Westfield, N.J.

[73] Assignee: Lucent Technologies Inc., Murray Hill, N.J.

[21] Appl. No.: 327,336

[22] Filed: Oct. 21, 1994

[51] Int. Cl.$^6$ .................................................. G06F 15/18
[52] U.S. Cl. ......................................... 395/62; 395/50
[58] Field of Search ........................ 395/50, 51, 60–62, 395/76, 700, 705, 702; 364/280, 280.4

[56] References Cited

U.S. PATENT DOCUMENTS

| | | | |
|---|---|---|---|
| 5,412,756 | 5/1995 | Bauman et al. | 395/50 |
| 5,423,041 | 6/1995 | Burke et al. | 395/700 |
| 5,586,330 | 12/1996 | Knudsen et al. | 395/705 |
| 5,649,200 | 7/1997 | Leblang et al. | 395/703 |

OTHER PUBLICATIONS

J. M. Crawford and B. Kuipers, "Formalizing Access–Limited Reasoning" *Principles of Semantic Networks Explorations in the Representation of Knowledge*, Edited by John F. Sowa, IBS System Research, 1991.

J. M. Crawford, B. J. Kuipers, "Short Algernon User's Manual", *Algernon User's Manual*, The University of Texas Artificial Intelligence Laboratory TR AI 91–166.

J. M. Crawford, B. J. Kuipers, "Algernon–A Tractable System for Knowledge–Representation", *SIGART Bulletin*, vol. 2, No. 3, Jun. 1991.

*Primary Examiner*—Tariq R. Hafiz

[57] ABSTRACT

Techniques for integrating rules into imperative object-oriented languages such as C++. C++ is extended to permit definition of rules as members of classes. When a rule is defined as a member of a class, a preprocessor receives the declaration of the rule's class and of any other class involved in the rule and generates additional data members and member functions for the classes. The additional members of the classes permit a complete implementation of the rule. No additional rule interpreter or decision network is required. The rule definition defines collections of objects linked by interobject pointers to which the rule applies. A rule is evaluated only if there is a change in a value mentioned in the rule in an object belonging to a collection of objects for the rule. The rule's condition is a sequence of bindings and tests. The bindings define a path through a collections of objects to which the rule applies, and the path is followed during evaluation. The rules thus implement access-limited logic.

20 Claims, 25 Drawing Sheets

```
1:  class Person {
2:    friend ostream& operator<< (ostream& s, Person * const);    /503
3:  private:
4:    String    name;
5:    Sex       sex;
6:    int       age;
7:    Person *  mother;                                           }505
8:    Person *  father;
9:    Person *  spouse;
10:   Set_of_p<Person> children;
11:
12:   rule reflexive_spouse;
13:   rule senior_mother_in_law;                                  }507
14:   rule child_sanity_check;
15: };
16:
17: // If x has spouse y, then y has spouse x.
18: rule Person::reflexive_spouse {
19:     Person *sp = spouse   ~511                                }504
20: =>      510        512
21:     sp->spouse_set (this); ~513
22: }        514
23:
24: // Note when/if husband's mother-in-law becomes senior citizen.
25: rule Person::senior_mother_in_law {
26:     Person *sp = spouse &&
27:     sp->sex ==female &&  516    }517
28:     Person *m = sp->mother &&
29:     m->age >= 65  518                                         }515
30: =>
31:     cout << this << "mother-in-law is a senior.\n";
32: }
    :                   :
```

```
33:
34:   //  Alert if a child is older than a parent.
35:   rule Person::child_sanity_check {
36:      Person *child @ children &&              } 521
37:      child->age > age     523                          } 519
38:   =>
39:      cout << child << "older than parent " << this << endl;
40:   }
```

FIG. 6
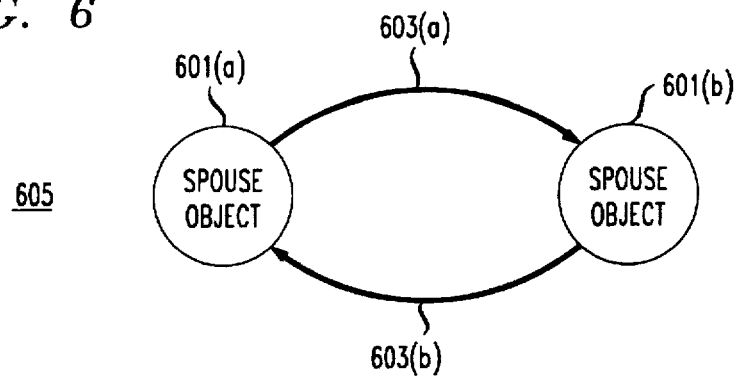
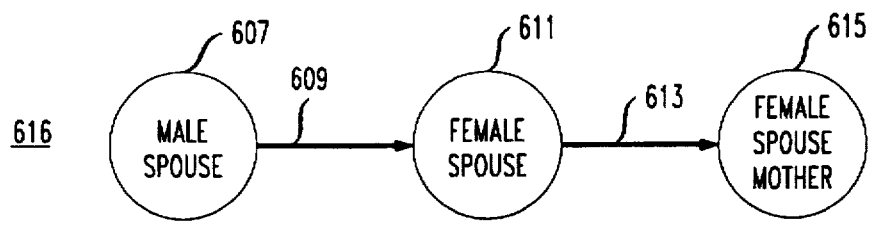
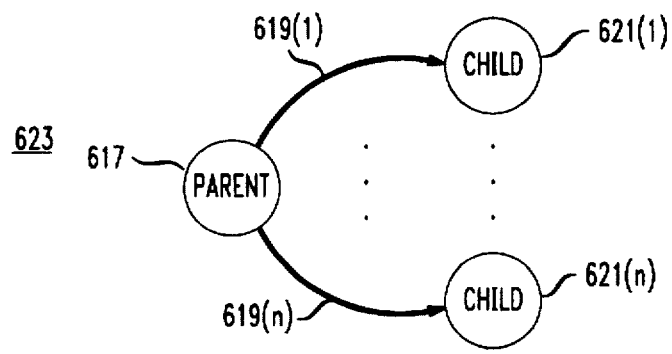
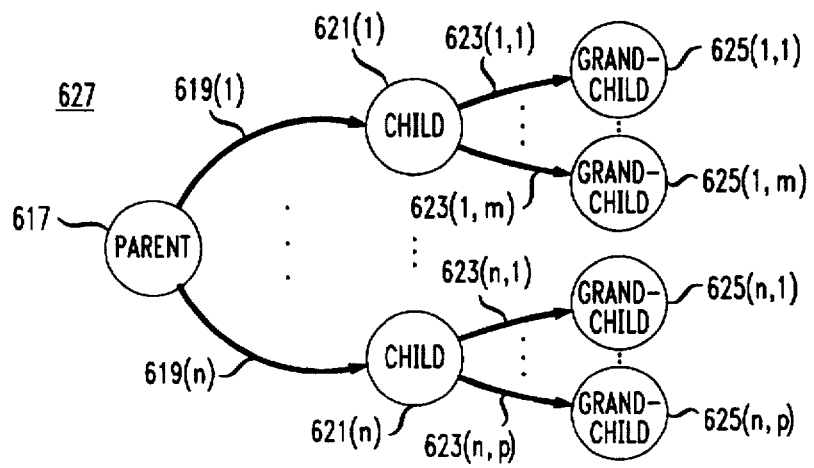

FIG. 7 rect.Rh:
```
1:  class Rectangle {
2:      friend ostream& operator<< ( ostream& s, Rectangle * const);
3:  private:
4:      float length, width, area;
5:  public:
6:      Rectangle(int 1, int w) : length(1), width(w) {};
7:
8:      rule update_area;
9:  };
``` rect.RC:
```
1:  rule Rectangle::update_area {
2:      length >= 0 &&
3:      width >= 0
4:      =>
5:      area_set(length * width);
6:  }
7:
8:  ostream& operator<< (ostream& s, Rectangle * const p) {
9:      return s << "Rectangle " << p->length << ","
10:                              << p->width  << ","
11:                              << p->area;
12: };
``` main.C:
```
1:  #include <iostream.h>
2:  #include "rect.rule.h"
3:
4:  main() {
5:      Rectangle *rp = new Rectangle(2,3);
6:      cout << rp << endl;
7:      rp->length_set(5);
8:      cout << rp << endl;
9:  }
```

```
 1: class Phone;
 2:
 3: class Line {
 4: private:              /-905
 5:    Phone *terminating_phone;              }-903
 6:    Boolean call_waiting, call_forwarding;
 7:    ...     907/              \909
 8:    rule pay_phone_restrictions;
 9: };           911/
10:
11:
12: class Phone {
13: private:              /-915
14:    PhoneType type;                    }-913
15:    ...
16:    friend rule Line::pay_phone_restrictions;
17: };           917/
18:
19: rule Line::pay_phone_restrictions {
20:    Phone *ph = terminating_phone &&
21:    ph->type: == PAY_PHONE &&          }-921
22:    ( call_waiting || call_forwarding )          }-919
23: =>
24:    cout << "Error: pay phone cannot have call-waiting or
          call-forwarding\n";
25:    call_waiting_set(0);          }-923
26:    call_forwarding_set(0);
27: }
```

```
1:  class Alarm {
2:    Time time;
3:    . . .
4:  };
5:
6:  class Device {
7:    List_of_p<Alarm> alarms;
8:    . . .
9:  };
10:
11: extern Time clocktime;
12:
13: // Return true if 3 alarms within last 10 minutes.
14: int threshold_test ( List_of_p<Alarm> alarms ) 0
15:   Time cutoff = clocktime - Duration::minutes(10);
16:   int num = 0;
17:   Set_of_piter<Alarm> iter(alarms);
18:   while (Alarm *ap = iter.next()) {
19:     if ((ap->time > cutoff) && (++num >= 3)) return 1;
20:   }
21:   return 0
22: }
23:
24: rule Device::alarm_alert {
25:   threshold_test (alarms)
26:   =>
27:   cout << . . . ;   1005
28: }
```

Lines 13–19 braced as 1007. Lines 24–27 braced as 1003.

```
 1:  int severity_threshold = 3;      ~1103
 2:
 3:  class Alarm {
 4:     int severity;
 5:     . . .      1104
 6:     rule severity_alert;
 7:  };
 8:
 9:  // Output a message for each alarm above the threshold.
10:  rule Alarm::severity_alert {
11:     severity >= severity_threshold                        1107
12:  =>
13:     cout << . . .
14:  }
```

1:  class Alarm{
 2:     int severity;          ⎫
 3:     Time time;             ⎬ 1203
 4:     . . .                  ⎭
 5:  };
 6:
 7:  class Device {
 8:     List_of_p<Alarm> alarms;        ⎫
 9:     Set_of_p<Device> dependents;    ⎬ 1205
10:     . . .                           ⎭
11:  };
12:
13:  // Warn if all alarms are severity 10.
14:  rule Device::serious {
15:     alarms.length() > 0 &&                       ⎫ 1208
16:     all Alarm *a @ alarms { a->severity == 10 }  ⎭
17:  =>
                 1209
18:     cout << . . .
19:  }
20:
21:  // Suspicious if all dependents had recent alarms.
22:  rule Device::dependent_alarms {
23:     dependents.size() > 0 &&
24:     all Device *d @ dependents {
25:        exists Alarm *a @ d->alarms {                        ⎬ 1213
26:           a->time > (clocktime - Duration::minutes(5)) }}
27:  => 1215
              1217
28:     cout << this << " is a suspect . . . ";
29:  }
```

(Braces on right: 1206, 1207, 1211)

```
1:  class X {
2:      int unit;
3:      rule increment;
4:      rule finished;
5:  };
6:
7:  rule X::increment {
8:      unit < 10
9:  =>
10:     activate_unit(unit);
11:     unit_set(unit + 1);
12: }
13:
14: rule X::finished {
15:     unit >= 10
16: =>
17:     cout << "activations finished\n";
18: }
```

Lines 7–12: 1303
Lines 14–18: 1305

FIG. 14
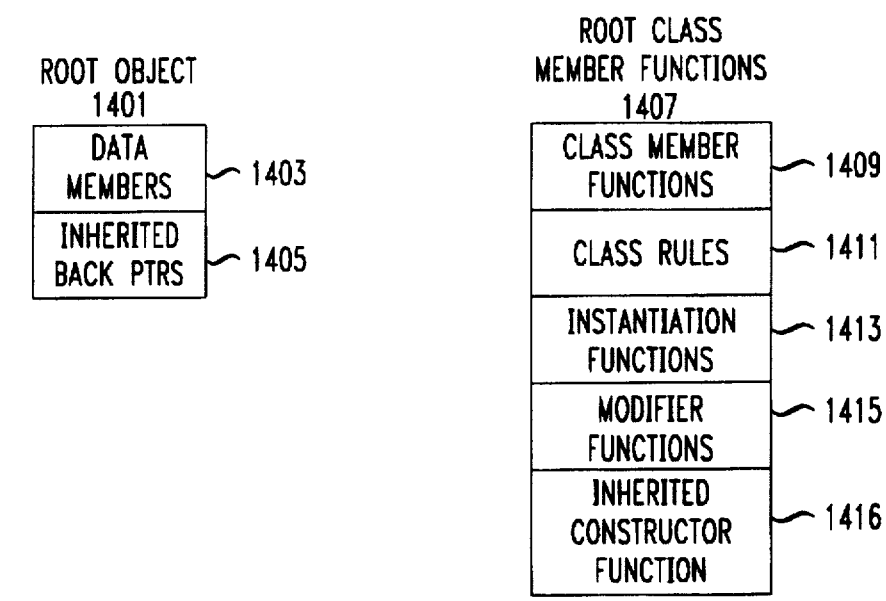
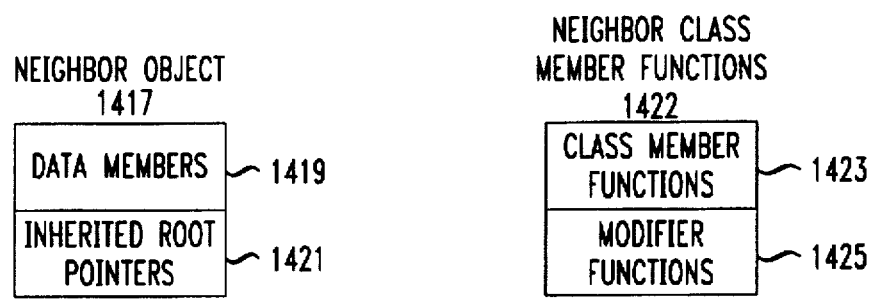
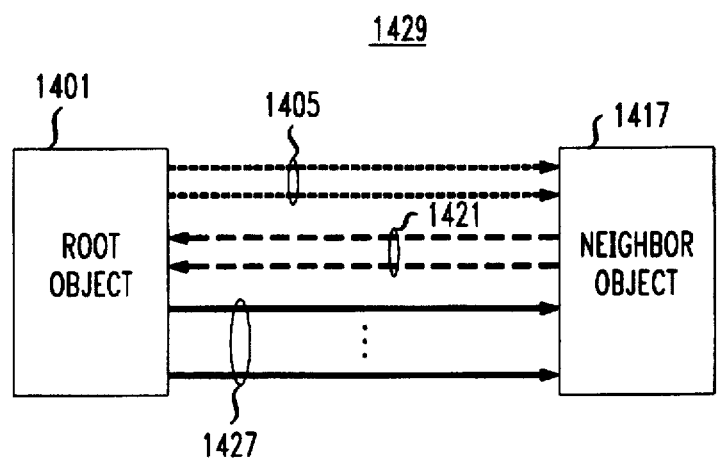

FIG. 16A
1601

```
 1:  include <iostream.h>
 2:
 3:  class Pet;
 4:
 5:  class Person {
 6:    protected: char* name;
 7:      int age;                        ~1609      /1608    }1603
 8:      Set_of_p<Person> children;
 9:      Pet * pet;    ~1607
10:    public: Person(char * n, int a);            }1610
11:      ~Person();
12:
13:      rule grandchildPetRule;
14:  };
15:                            /1612
16:  class Pet {
17:      friend rule Person::grandchildPetRule;
18:      char * name; int age; char * breed;        }1611
19:    public: Pet(char * n, int a, char * b);   }1614
20:      ~Pet();
21:  };
22:
        ⋮                        ⋮
```

```
1:  #include <iostream.h>
2:  #include "example.rule.h"
3:
4:  class Person;
5:
6:  class Pet : public Pet__rpp         ⎫
7:      friend Person;         ∼1727    ⎬ 1725
8:      void Person_grandchildPetRule_grandchildPet_revisit ();  ∼1729
9:
10:     private: char * name; int age; char * breed;   ⎫
11:     public: Pet(char * n, int a, char * b);        ⎬ 1723
12:     ~Pet ();
13: };
14:
    . . .
```

FIG. 17B
1701

```
15:  class Person : public Person__rpp { 
16:    friend void Pet::Person_grandchildPetRule_grandchildPet_revisit();    ~1711
17:    void rpp_start ();
18:    void Person_grandchildPetRule_start ()    ~1715
19:      ( Person_grandchildPetRule_restart(0,0,0);
20:    void Person_grandchildPetRule_restart(int,int,int);    ~1717
21:    int Person_grandchildPetRule_restart_given_child
22:      (Person * child,int,int);
23:    int Person_grandchildPetRule_restart_given_grandchild    ~1719
24:      (Person * grandchild,int);
25:    int Person_grandchildPetRule_restart_given_grandchildPet
26:      (Pet * grandchildPet);
27:    void Person_grandchildPetRule_restart_new_child(Person * child);
28:    int Person_grandchildPetRule_restart_given_child_new_grandchild
29:      (Person * child,Person * grandchild);
30:    void Person_grandchildPetRule_child_revisit
31:      (int ch_grandchild, int ch_grandchildPet);
32:    void Person_grandchildPetRule_grandchild_revisit    ~1721
33:      (int ch_grandchildPet);
34:    void Person_grandchildPetRule_child_grandchild_revisit
35:      (Person * grandchild);
```

```
36: ...
37: public: virtual void children_insert(Person *);
38: virtual void children_remove(Person *);
39: virtual void pet_set( Pet * pet );
40: virtual void age_set ( int age );
41:
42: protected: char* name;
43: int age;
44: Set_of_p<Person> children;
45: Pet * pet;
46: public: Person(char * n, int a);
47: ~Person();
48: };
```

```
1:  #include <Set.h>
2:
3:  class Person;
4:  class Pet;
5:
6:  /* Parent class definition for Person*/
7:  class Person__rpp {
8:      friend Pet__rpp;
9:    protected:
10:     Set_of_p<Person> Person_grandchildPetRule_
              child_r_roots;
11:     Set_of_p<Person> Person_grandchildPetRule_
              grandchild_r_roots;
12:     Set_of_p<Pet> Person_grandchildPetRule_
              grandchildPet_r_roots;
13:     Set_of_p<Person> Person_grandchildPetRule_child_roots;
14:     Set_of_p<Person> Person_grandchildPetRule_grandchild_
              roots;
15:     Person__rpp() { }
16:     ~Person__rpp();
17: };
18:
19: /* Parent class definition for Pet*/
20: class Pet__rpp {
21:     friend Person__rpp;
22:   protected;
23:     Set_of_p<Person> Person_grandchildPetRule_
              grandchildPet_roots;  ← 1811
24:     Pet__rpp() { }
25:     ~Pet__rpp();
26: };
```

```
1:   void Person::age_set ( int age ) {
2:     if ( this->age != age ) {                        } 1903
3:       this->age = age;                                              } 1901
4:       Person_grandchildPetRule_restart(0,1,0);  ~ 1905
5:       Person_grandchildPetRule_grandchild_revisit(0);  ~1907
6:     }
7:   }
8:
9: void Person::Person_grandchildPetRule_restart
10:         (int ch_child, int ch_grandchild,               1909
      1913  int ch_grandchildPet) {
11: if ( age > 70 ) {           1911                         1915
12:   Set_of_piter<Person> iter_child =
13:              Set_of_piter<Person>(this->children);
14:   for ( Person * child = iter_child.next() ;
15:          child ; child = iter_child.next() ) {         1917
16:     child->Person_grandchildPetRule_child_roots.insert(this);
17:     Person_grandchildPetRule_child_r_roots.insert(child);
18:     if ( !ch_child || ( ((void *)child) != ((void *)this) ) ) {
19:       Set_of_piter<Person> iter_grandchild =
20:              Set_of_piter<Person>(child->children);
21:       for ( Person * grandchild = iter_grandchild.next() ;
            grandchild;
22:              grandchild = iter_grandchild.next() ) {
23:         grandchild->Person_grandchildPetRule_grandchild_
            roots.insert(this);
24:         Person_grandchildPetRule_grandchild_r_roots.inset
            (grandchild);
                                                            1919
              ⋮                    ⋮                    ⋮
```

FIG. 19B

```
 25:      if ( !ch_grandchild ||
 26:                ( ((void *)grandchild) != ((void *)this) ) ) {
 27:        if ( grandchild -> age <= 10 ) {
 28:  Pet * grandchildPet = grandchild -> pet ;
 29:  if ( grandchildPet ) {
 30:    grandchildPet->
 31:        Person_grandchildPetRule_grandchildPet_roots.
             insert(this);
 32:  Person_grandchildPetRule_grandchildPet_r_roots.insert
 33:             (grandchildPet);
 34:  if ( !ch_grandchildPet || ( ((void *)grandchildPet) !=
 35:             ( (void *)this) ) ) {
 36:        if ( pet -> age <= grandchild -> age ) {
 37:          cout << "Found old person " << this->name <<
 38:               " with young grandchild "
 39:          << grandchild << "with pet " <<
               grandchildPet << "\n" ;
 40:        }
 41:  } }
 42:        }
 43:  } }
 44:  } }
 45:  }
 46: }
```

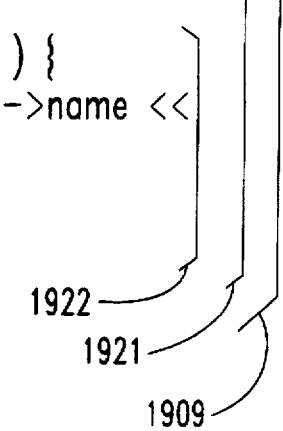

```
1:  void Person::Person_grandchildPetRule_grandchild_revisit
2:              (int ch_grandchildPet) {
3:    Set_of_piter<Person> iter = Set_of_piter<Person>
4:              (Person_grandchildPetRule_grandchild_roots);
5:    for ( Person * root = iter.next() ; root ; root = iter.next () ) {
6:      if ( !root->Person_grandchildPetRule_restart_given_grandchild
7:              (this, ch_grandchildPet) ) {
8:        Person_grandchildPetRule_grandchild_roots.remove(root);
9:      }
10:   }
11: }
12:
13:
14: int Person::Person_grandchildPetRule_restart_given_grandchild
15:             (Person * grandchild, int ch_grandchildPet) {
16:   int reached = 0;
17:   if ( age > 70 ) {
18:     Set_of_piter<Person> iter_child = Set_of_piter<Person>
19:             (this->children);
20:     for ( Person * child = iter_child.next() ; child ;
21:             child = iter_child.next() ) {
22:       if ( child->children.contains(grandchild) ) {
23:         reached = 1;
          ⋮                    ⋮
```

FIG. 20B

```
24:     if ( grandchild -> age <= 10 ) {
25:     Pet * grandchildPet = grandchild -> pet ;
26:     if ( grandchildPet ) {
27:      grandchildPet->Person_grandchildPetRule_grandchildPet_
         roots.insert
28:              (this);
29:     Person_grandchildPetRule_grandchildPet_r_roots.insert
30:              (grandchildPet);
31:     if ( !ch_grandchildPet || ( ((void *)grandchildPet) !=
32:              ( (void *)grandchild) ) ) {
33:      if ( pet -> age <= grandchild -> age ) {
34:         cout << "Found old person " << this
                 << " with young grandchild"
35:              << grandchild << " with pet " << grandchildPet
                 << "\n" ;
36:       }
37: } }
38:     }
39:   }
40:   }
41:    }
42: return reached;
43:}
```

2007
2009
2003

INTEGRATING RULES INTO OBJECT-ORIENTED PROGRAMMING SYSTEMS

BACKGROUND OF THE INVENTION

1. Field of the Invention

The invention concerns programming systems generally and more particularly concerns object-oriented and rule-based programming systems.

2. Description of the Prior Art

An important use of programming is to model real systems. In programs which model real systems, the entities in the system are represented by data and the program responds to changes in the data by undertaking actions which themselves may change the data. Two fundamentally different techniques have emerged for writing such programs. One technique uses imperative programming systems and the other uses data-driven programming systems. When an imperative programming system is used, the system is modelled by means of data and imperative code which specifies operations on the data and the order in which they are performed. In data-driven programming systems, the system is modelled by means of data and a set of rules. Each rule contains a condition, which specifies a condition of the data, and an action, which specifies what is to be done when the data is in the specified condition. Whenever a portion of the data changes, the rules in the set of rules whose conditions involve that data are examined, and if the rule's condition is satisfied, the rule fires, that is, its action is performed. The action may of course modify the data, and, consequently, firing of one rule may result in firing of other rules. An example of a programming system which uses data-driven techniques is OPS5. For details see Thomas A. Cooper, Nancy Wogrin, *Rule-based Programming with OPS5*, Morgan Kaufmann 1988.

As imperative programming systems have developed, more and more attention has been paid to high-level representations of the entities making up the system being modelled. One result of this attention is object-oriented programming languages such as C++, in which the entities in the system are modelled as objects. Each object has a class which defines how the object can relate to the other entities in the system and what can be done with the object. The high-level representations employed in the object-oriented programming systems make it possible to create understandable and maintainable models of complex systems. For details on C++, see Bjarne Stroustrup, *The C++ Programming Language* (2nd edition), Addison-Wesley, 1992.

While object-oriented programming systems have made it much easier for programmers to model complex systems, they remain imperative. In consequence, they are unable to easily model data-driven system behavior. At the same time, the ability of data-driven techniques to model complex systems has not increased. In particular, as the set of rules gets larger, it becomes more and more difficult to understand how rules interact with each other and thus to understand the effect of modifying the set of rules.

Because object-oriented programming systems cannot easily model data-driven behavior and data-driven techniques do not handle complexity easily, programmers have been left with no good way of building data-driven models of complex systems. Since most such systems do exhibit such behavior, the lack of a good way to build models of the behavior is a serious problem. It is an object of the invention disclosed herein to solve this problem by providing techniques for integrating rules into imperative object-oriented programming systems and thereby making it possible to build data-driven models of complex systems.

SUMMARY OF THE INVENTION

The invention is a programming system which provides an extension called R++ to the well-known C++ object-oriented programming language. The R++ extension permits rules to be defined as members of C++ classes. The programming system of the invention takes the classes with rules defined using R++ and generates C++ code from them in which the machinery required for the rules is implemented completely as C++ data members and functions of the classes involved in the rules. Thus, no separate rule interpreters or decision networks are required.

The systems of rules produced by the programming system apply to collections of objects linked by object pointers defined in the class definitions for the objects. The rules have the property that a rule's condition is evaluated only when a change occurs in a data member in an object which belongs to a collection of objects to which the rule can apply.

When a change which is relevant to a rule occurs in an object belonging to a collection of data objects to which the rule applies, evaluation of the rule's condition is done by locating a root object of the collection from which the rule can be evaluated and making bindings and performing tests as specified in the rule's condition. The bindings follow the pointers linking the objects belonging to the collection as required by the bindings specified in the rule's condition. The pointers are followed only to the extent required to evaluate the rule for the change which resulted in the evaluation. Because the rules are evaluated by following the object pointers, the systems of rules implement access-limited logic.

Other objects and advantages of the apparatus and methods disclosed herein will be apparent to those of ordinary skill in the art upon perusal of the following Drawing and Detailed Description, wherein:

BRIEF DESCRIPTION OF THE DRAWING

FIG. 2 is an overview of a representation made using a prior-art data-driven system;

FIG. 5 is an example of rules in a preferred embodiment;

FIG. 6 is a diagram of paths resulting from bindings;

FIG. 7 is a second example of rules in a preferred embodiment;

FIG. 9 is a third example of rules in a preferred embodiment;

FIG. 10 is a fourth example of rules in a preferred embodiment;

FIG. 11 is a fifth example of rules in a preferred embodiment;

FIG. 12 is a sixth example of rules in a preferred embodiment;

FIG. 13 is an illustration of rule firing;

FIG. 14 is a diagram of members of objects whose classes have rules or are mentioned in rules;

FIG. 17 is the source code for FIG. 16 as modified by the preprocessor of the preferred embodiment;

FIG. 18 is example _rpp classes generated by the preprocessor;

FIG. 19 is a first example of member functions generated by the preprocessor; and FIG. 20 is a second example of member functions generated by the preprocessor.

Figure 1:
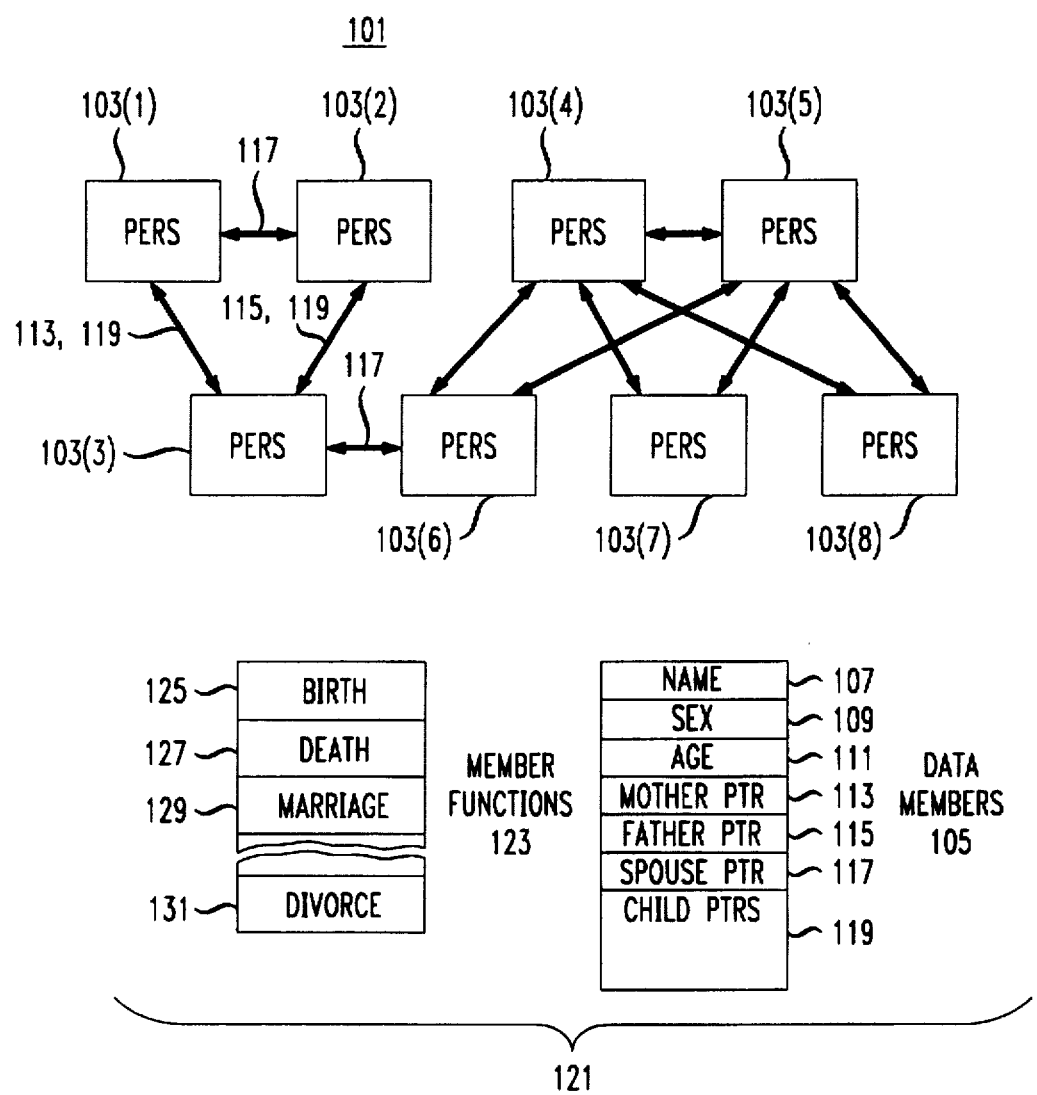
FIG. 1 is an overview of a representation made using a prior-art object-oriented system.

Reference numbers in the Drawing have two parts: the two least-significant digits are the number of an item in a figure; the remaining digits are the number of the figure in which the item first appears. Thus, an item with the reference number 201 first appears in FIG. 2.

DETAILED DESCRIPTION OF A PREFERRED EMBODIMENT

The following Detailed Description will first provide an overview of object-oriented and data-driven programming systems to the extent needed to understand the preferred embodiment, will then describe the preferred embodiment as it appears to the C++ programmer, and will finally describe details of the implementation of the preferred embodiment.

OBJECT-ORIENTED AND RULE-BASED PROGRAMMING SYSTEMS

The following discussion provides an introduction to prior-art object-oriented and rule-based programming systems.

Using C++ to Model a System: FIG. 1

FIG. 1 shows how a system appears to a C++ programmer. In this case, the system represents a family 101. The family is modelled as a set of objects 103 which have the class person. Each person object 103 is linked (indicated by arrows) to person objects for other members of the family. In family 101, there are links between parents and children and between spouses. Thus, 103(1) and 103(2) are spouses, with one child 103(3), whose spouse 103(6) is one of three children 103(6), 103(7), and 103(8) of the spouses 103(4) and 103(5).

The class person is defined by its members 121. C++ has two kinds of members: data members 105, which comprise the data that each object of the class contains, and member functions 123, which are the functions which manipulate the data members. Members 121 may be either public, in which case they are part of the interface of the object, or private or protected, in which case they are accessible only from member functions and friends of the class.

In FIG. 1, each person object 103 has as its data members the name of the person represented by the object, in field 107; the person's sex, in field 109; the person's age, in field 111; a pointer to the person object which represents the person's mother, in field 113; a pointer to the person object which represents the person's father, in field 115; and a pointer to the person object which represents the person's spouse, in field 117. Field 119, finally, contains pointers to the person objects for any children of the person. Thus, person 103(1) is linked by spouse pointer 117 to person 103(2), while person 103(1) and 103(2) are both linked to person 103(3) by child pointers 119, and person 103(3) is linked to person 103(1) by mother pointer 113 and to person 103(2) by father pointer 115. Relationships among the persons represented by person objects 103 can be defined by the pointers. For example, the mother-in-law of person 103(5)'s son (represented by person object 103(6)) is the person whose person object is found by following person object 103(5)'s child pointer 119 to person object 103(6), following object 103(6)'s spouse pointer 117 to person object 103(3), and following person object 103(3)'s mother pointer 113 to person object 103(1).

A set of possible member functions for objects 103 with the person class is shown at 123. Birth function 125 creates an object of class person; mother pointer 113 and father pointer 115 point to the person objects for the parents and all the other pointers are set to null; the function also sets child pointers 119 in the person objects for the parents; death function 127 sets all links connecting a person object to other person objects and vice versa to null and then destroys the person object; marriage function 129 sets spouse pointer 117 in the person objects for the pair getting married; divorce function 131, finally, sets this pointer to null. Typically, the above member functions are public, while the pointer data members are private.

Figure 3:
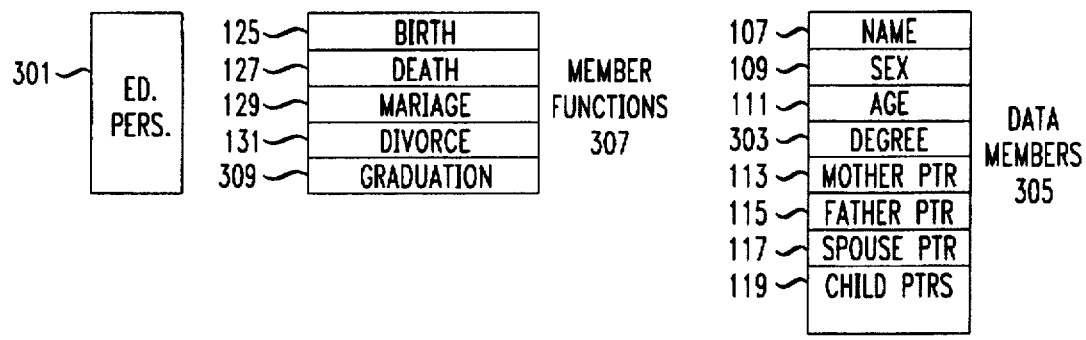
FIG. 3 is a diagram illustrating inheritance in a prior-art object-oriented system.

An important feature of C++ is that classes can be defined in terms of other classes. When this is the case, the class which is being defined inherits the other class's members, except for member functions that are overridden in the class being defined. The class whose members are being inherited is called the base class and FIG. 3 shows how this works. The base class is person and the derived class is educated person. It differs from person in that it includes a new data member, degree 303, which is the highest degree received by the person, and a new member function, graduation 309, which sets degree 303 to indicate which degree the person represented by the educated person object has. Because educated person inherits from the person class, all of the members of person are members of educated person as well. Consequently, the member function birth 125 is usable in the same fashion in educated person objects as it is in person objects, and the same is true of the other member functions 123 of class person.

Using a Data-Driven Programming System to Model a System: FIG. 2

FIG. 2 shows how a data-driven programming system might be used to model family 101. There is a data structure 205 for each person, but this time identifiers are used instead of pointers to establish relationships. name 207, sex 209, and age 211 are like their counterparts in person object 105, but the other relationships are expressed with status values (born 213, died 237, married 239, and divorced 243) and the names of related persons (mother__name 233, father__name 235, spouse__name 241, and the list of child__name 245).

There is change monitor 215, which monitors any change in the data values contained in a set 204 of data structures, including person data structures 205, and rule base 219, which contains rules 221. Each rule 221 has two parts: a condition 223 which is expressed in terms of the data contained in a data structure 205 and an action 225 which is executed for any group of data structures 205, which satisfy the rule's condition 223. For example, a rule may state that if born 213 in some person data structure has the value true, name 207 is to be added to the list of child__name 245 in data structures 205 for which name 207 is the same as mother__name 233 or father__name 235 and that thereupon, born 213 is to be set to a null value.

Operation of apparatus 201 is as follows: change monitor 215 constantly monitors for changes in data values in set 204 of data structures 205. When a change occurs, for example because of a change input 217, change monitor 215 provides the data structures 205 for which the change occurs to rule base 219, which determines whether the change has satisfified a condition 223 in a rule 221. If it has, the rule is fired, causing the rule's action 225 to be executed. The action may change other values in data structures 204 or it may result in other output 231. Of course, if the action changes values in data structures 204, other rules 221 may be fired as a result of those changes.

In the case of the example rule 221 described above, when a person is born, change input 217 adds a new person data structure to set 204. In the new data structure, fields 207, 209, and 211 are set to the name, sex, and age of the child, born status set to true, and the names of the mother and father are placed in fields 233 and 235. Change monitor 215 responds to the addition of a new person data structure to set 204 by providing the new data structure to rule base 219. Because the new data structure's born status 213 is set to true, the example rule fires and the action described above is performed. The action of course results in changes in the list of child_name 245 in the data structure 205 representing the child's mother and in the data structure 205 representing the child's father.

Other changes of status are treated similarly. For example, when change input 217 indicates that a person has married and provides the name of the spouse, married field 239 is set to true and spouse_name 241 is set to the name of the spouse in the person data structure for the marrying person. Change monitor 215 notices the change and provides this person data structure to rule base 219. Rule base 219 may contain a rule whose condition is that married is true and whose action is to set spouse_name field 241 in the data structure 205 indicated by spouse_name 241 in the data structure being examined to name 207 from the data structure being examined and to set married in both data structures to a null value.

Data-driven programming systems have further mechanisms not relevant to the invention, including mechanisms for allowing users to control which rule runs first when more than one rule can be run in response to a change in the data structures.

There are two characteristics of the operation of system 201 that need to be mentioned here. The first is that change monitor 215 responds to any change in the data in set 204, whether or not the data item which changes is involved in a condition 223 for a rule 221. The second is that references to multiple data structures in the condition 223 of a rule 221, require that system 201 must monitor all collections of data structures that can satisfy the condition.

INTEGRATING RULES INTO OBJECT-ORIENTED PROGRAMMING SYSTEMS

This section will first provide an overview of how rules may be integrated into object-oriented programming systems and will then provide a number of examples of their application and will describe the syntax and semantics of R++, an extension of C++ which incorporates rules.

Figure 4:
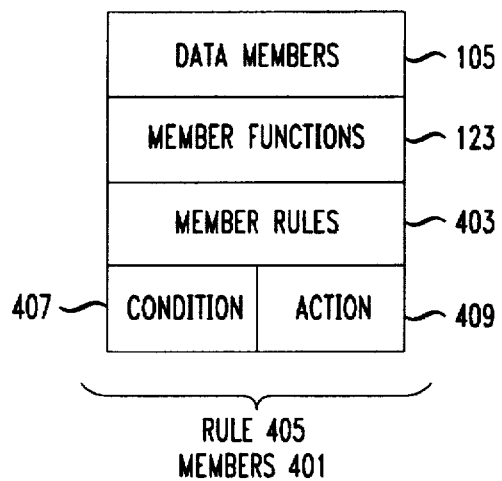
FIG. 4 is a diagram illustrating class members in the object-oriented system of the invention.

Object-oriented Programming Systems with Rules: FIG. 4

In the preferred embodiment, rules are integrated into an imperative object-oriented programming system by treating them as members of a class. Thus, as shown in FIG. 4, members 401 of a class in such a programming system include not only data members 105 and member functions 123, but also member rules 403. Member rules, like the other members 401 of the class, define the class and may be inherited by derived classes. Like member functions, member rules can be overridden in derived classes.

Member rules 403 apply to objects belonging to the class of which the rule is a member. Like the member functions 123 of C++, member rules have a name and an implicit this variable, which points to an object belonging to the class of the rule. This object is called the root object. Unlike the member functions 123 of C++, member rules have neither arguments nor a return type, and cannot be called from other functions. Like the rules 221 of data-driven programming system 201, each member rule 405 has a condition 407 and an action 409. Conditions 407 are sequences of bindings and tests. A binding specifies the binding of a rule variable, which is local to the rule. The this variable is considered to be the first rule variable, and is bound to the object above. A test is a C++ boolean expression, which can use any previously bound rule variable.

An event which results in the evaluation of a rule's condition 407 is said to trigger the rule. When a rule 403 is triggered, its condition 407 is evaluated. Evaluation of condition 407 evaluates each binding and test in it in the order they occur and continues until all bindings and tests are evaluated or until one binding or test does not succeed. If all bindings and tests succeed, the condition 407 is said to be satisfied, and the rule 403 is fired, which executes the action 409 of the rule.

A test succeeds if it evaluates to true, i.e., non-zero or non-null.

A binding of a rule variable can be either a simple binding or a branch binding. A simple binding binds its variable to the value of a C++ expression, and succeeds if this value is non-zero (non-null for pointers). A branch binding binds its variable in turn to each of the elements of a list or set of pointers to other objects, which list or set is given as a data member of the object pointed to by a previous object pointer-valued rule variable. A branch binding succeeds multiple times, once for each element of this list or set.

The bindings of variables are generally written in such a way as to result in variables being bound to objects that can be reached by following paths starting with the root object and following pointers in data members. Each collection of bindings resulting from a traversal of a path is an instantiation of the rule. Because evaluation involves an instantiation created by traversing a path, the rules used in the preferred embodiment are called path-based rules. Systems of such rules 405 behave like the access-limited logic described in J. M. Crawford and Benjamim Kuipers, "ALL: Formalizing Access-limited Reasoning", in *Principles of Semantic Networks*, ed. John F. Sowa, Morgan Kaufmann, San Mateo, Calif., 1991, pp. 299–330.

Actions 409 are sequences of C++ statements, which can incorporate the rule variables. Actions 409 are executed just as other C++ statements are, with the rule variables bound to values as determined by the bindings in the satisfied condition 407 of the rule 405. The firing of the rule may of course result in changes to values that the given rule or other rules are dependent on.

Relevancy

An event which results in the evaluation of a rule's condition is said to trigger the rule. Rules 405 are triggered according to the following principle: if creation of an object or a change in a data member of an object could possibly cause the condition 407 to be satisfied, and thus to fire the rule 405, then trigger the rule 405. Object creations which trigger a rule are called relevant constructions; changes in data members which trigger a rule are called relevant changes. The following explains relevant construction and relevant change in more detail.

All rules defined within class C are triggered with this pointing to the constructed object whenever a new instance of C is constructed because the object may be initialized with values that satisfy the condition of a rule. Also, since rules are inherited, rules of class C are also triggered whenever an instance of a derived class of C is constructed. No other rule is triggered. In particular, a rule that is defined in another class which is not a base class for C but which references class C and/or its derivatives, is not triggered. Even though such a rule describes a path to objects of class C, the mere creation of such an object cannot also create an instantiation involving the object. Thus, such rules are not triggered because they cannot possibly cause the condition of the rule to be satisfied.

A rule that mentions some data member x of class C in its condition may be triggered when the value of x is changed in an object, depending on the kind of change and the way that x is used in the rule condition. "Change" means that the new value of the data member is different than the old value. If x is a multi-valued data member (a set or list), then "change" means that a new element is added or an existing element is removed. Addition of a pre-existing element to a set is not considered a change, nor is "removal" of an object that is absent from a set.

Relevant change triggers all rules that could potentially fire in response to the changed data member. With one exception, this means that if the data member appears in a rule's condition, the rule is triggered by the change. The one exception is when the change is deletion of an element from a set-valued or list-valued data member which appears only within a branch binding of a rule's condition. In this case the rule is not triggered because no new instantiation can be formed.

Guaranteed Behavior of Rules

In a preferred embodiment, rules 405 are guaranteed to behave as follows:

1. Triggering:

Modifier functions and constructor functions guarantee to trigger all relevant rules.

Rules are never triggered by irrelevant changes or by changes that bypass the modifier functions.

2. Firing:

A rule is fired when its condition is satisfied, provided it has not already fired on the same instantiations in the same relevant state (refraction).

When rule activity completes, all rules have been run on all the instantiations that satisfy their conditions.

3. Firing-Order:

From any triggering event, rules are fired in depth-first forward chaining order.

If an event simultaneously triggers more than one rule, the order of evaluation is unspecified, except that rules on base classes are triggered after rules in their derived classes.

The above behavior is enforced by means of modifier member functions in the objects. All modifications of data members which are involved in rule conditions must be made using modifier member functions. For that reason, it is generally best to treat such data members as C++ private data members. The compiler used in R++ automatically generates modifier functions, unless the programmer has already defined them. In C++ terms, a modifier function is a non-const member function having a stereotyped name based on the name and kind of data member that it modifies. For a single-valued data member named dm, the modifier function is named dm__set. For a multi-valued data member, such as a set or list of pointers, function names dm__insert and dm__remove are used.

EXAMPLES OF RULES

In the following, a number of examples are presented which show how R++ rules may be employed to solve common programming problems. The first example is explained in detail; the remaining examples show additional features of R++.

First Example

FIGS. 5–6

The first example, shown in FIG. 5, is the R++ definition 501 for a version of the person class of FIG. 1 which includes three rules. Except for the rule declarations and definitions, definition 501 uses standard C++ syntax. Thus, a friend function, namely that associated with the << operator, is mentioned at 503 and the data members are defined at 505. Three rule names are declared at 507. The rules themselves are defined at 509, 515, and 519, respectively.

Continuing in more detail with the individual rules, rule 509 is a simple inter-object rule that enforces an invariant: if person x has spouse y, then y has spouse x. Consequently, spouse__ptr 117 in the person object representing x must be a pointer to the person object representing y and vice-versa. Condition 511 is nothing more than the simple binding of the rule pointer variable sp to the value in data member spouse for an object of class person 501. This data member points to the object representing the spouse of the person represented by the current object. Simple bindings generally have the form class-name*var-name=expression The single simple binding performed by rule 509 defines a path of length 1 (from a person to his/her spouse). The path appears as path 605 in FIG. 6: Spouse object 601(*a*) is connected by a path 603(*a*) to spouse object 601(*b*) and vice-versa; each is a separate path 605 of length 1.

When rule 509 is triggered, sp is bound to the current value of spouse in its root object. The rule is triggered when a relevant construction occurs, i.e., when a new object of class person is created, or when a relevant change occurs, i.e., when the value of spouse in an object of class person is changed. It should be noted that the fact that the value of spouse must change to trigger the rule ensures that the firing of rule 509 in the spouse object in response to the firing of rule 509 in the original person object will not result in a new triggering of rule 509 in the original person object.

If sp does not have the value zero in the binding the binding succeeds, and thus the condition of the rule is satisfied and the rule fires. When the rule fires, rule variable sp is used in line 21 to assign a pointer to the root object to the spouse's spouse data member. The assignment is done by modifier member function 514 spouse__set. A modifier member function not only performs the assignment, but also triggers any rules that mention the data member set by the function.

Continuing with rule 515, this rule outputs a message that the person's mother-in-law is a senior whenever the person represented by the root object is a husband and his mother-in-law is at least 65. Here, there are two simple bindings in condition 517: sp, which is bound to spouse as before, and m, which is bound to a pointer to the object representing the mother-in-law. As the example shows, simple bindings can be concatenated to form longer paths. The path for this example is shown as path 616 in FIG. 6. Path 616 has length 2, since it goes via pointer 609 from the root male spouse object 607 to female spouse object 611 and via pointer 613 from female spouse object 611 to object 615 for the spouse's mother.

As tests 516 and 518 show, boolean tests can be interspersed with bindings to specify restrictions on the objects in the path. Test 516 ensures that the root object represents a husband by testing the sex data member to determine whether the spouse object is female and test 518 confirms that the mother-in-law is in fact age 65 or more. Bindings and tests are evaluated in the order in which they appear. If a binding or test does not succeed, the evaluation of the condition is discontinued. When rule 515 fires, it outputs the message.

Rule 515 is triggered when any object of class person is created and also whenever the value of any of the following data members is changed: spouse, sex, mother, age.

The condition 521 of rule 519, finally, contains an example of branch binding 523. Rule 519 looks for a child of a person that is older than the person, or, in other words, an object representing a child of the person represented by the root object containing a value for its age data member that is greater than the value for that data member in the root object.

Branch bindings are indicated by a "commercial at" sign. They are like simple bindings except that they apply to multi-valued data members (sets and lists). Branch binding 523 binds the rule variable child to each of the pointers to person objects representing children of the root object in turn. The multiple paths resulting from branch binding 523 are shown as paths 619 in FIG. 6. For each such binding, the test child->age > age is performed for that binding (i.e., the age data member in each child object is compared with the age data member in the root object), and if that binding satisfies the test, the rule is fired with that particular binding. The message output by the action will thus be output for every child of the parent whose age is greater than the parent's age.

The paths 619 are of length one, but longer lengths are possible from branch bindings. In general, simple bindings and branch bindings can be used in any mixture to describe a path of any length. The following rule shows a pair of branch bindings:

| 1: | rule Person::young_grandchildren { |
| 2: | Person *child @ children && |
| 3: | Person *grandchild @ child->children && |
| 4: | grandchild->age < 18 |
| 5: | => |
| 6 | cout . . . ; |
| 7: | } |

There are two branch bindings: child to children and grandchild to child's children. The multiple paths resulting from these two branch bindings are shown as paths 619 (1..n) from parent 617 to each child 621 and paths 623(x, 1..y) from child 621(x) to each grandchild 625(1..y) in FIG. 6.

Returning to rule 519, that rule is triggered whenever a new person object is created, whenever a new Person object is added to a person object's set of children, and whenever a Person object's age data member changes its value. Evaluation (and possible firing) of the rule is as follows: In the case of object creation, the rule is evaluated for each binding of the children pointers of the newly-created object to child, i.e., all of the branch paths are taken. When a child object is added to the parent object, the rule is evaluated only for the new binding of the children pointers, i.e., only the path for the newly-added child is taken. When the value of age changes in an existing Person object, the rule is evaluated for an existing path on which the existing Person object is either a parent or a child on the path. To express this behavior in more general terms, a branch binding introduces an N-way branch, where the rule must monitor all N branch paths. If a new element is added to the set or list, it simply adds another branch path to be monitored.

The fact that rules 405 in the preferred embodiment are path based makes systems of rules 405 more efficient than systems of rules such as OPS5 which use pattern matching to locate objects which affect firings of rules. In such pattern matching systems, inter-object relationships are computed by performing "joins" between sets of objects, with a concomitant cost in time ans space complexity. With path-based rules, inter-object relationships are evaluated simply by following the pointers which connect the related objects.

Second Example

Figure 8:
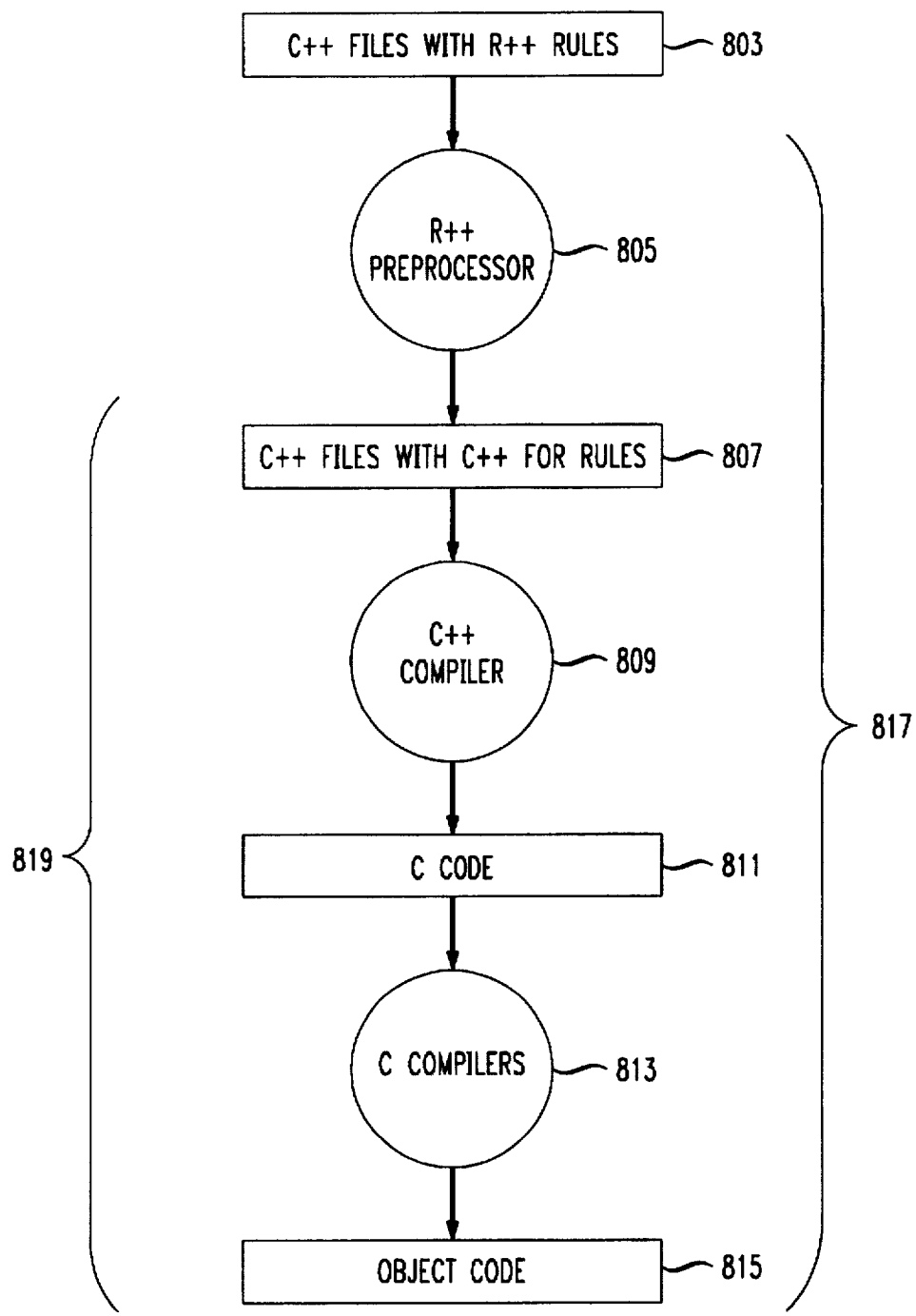
FIG. 8 is a diagram of the preprocessing and compilation process in a preferred embodiment.

FIGS. 7 and 8

The second example is a complete R++ program which employs a rule 405 to ensure that the area of a rectangle is recomputed every time the rectangle's length or width changes. The program is shown in FIG. 7. The source code of program 701 is divided into three files in accord with standard C++ practice: a header file 703 in which the names of a class and its member rules and functions are declared and the data members are defined, an associated source file 713 for the definitions of member functions and rules, and a main program source file 719. All of the source code in program 701 is ordinary C++ statements except for the rule declaration 711 and the rule definition 715.

Continuing in more detail, class Rectangle has three private data members, length, width, and area, defined at 705. These data members contain the length, width, and area of the rectangles represented by objects of class Rectangle. At 709, a C++ constructor is defined: the constructor makes a new Rectangle object by allocating storage for the data members defined at 705, setting the length and width as specified by the values of the constructor's arguments, and returns a pointer to the Rectangle object. At 711 a rule, update_area is declared. At 704, finally, there is a declaration of a friend function involving another object ostream, which represents an output stream. The friend function, represented by the << operator, is used to output data to the output stream.

The definitions of rule update_area and friend function << are at 713. Rule definition 715 has a condition which contains tests, but no bindings. The condition is satisfied if the data members length and width both have values greater than or equal to 0; when rule 711 fires, it computes a new value for area. Since no bindings are in the condition, rule 711 has a path length of 0. Rule 711 is triggered whenever a Rectangle object is created or the value of either length or width changes in an existing Rectangle object. Friend function 717 takes as its arguments a pointer to an output stream object and a pointer to a Rectangle object. It outputs the string "Rectangle" followed by the values of length, width, and area for the Rectangle object.

Main program 719 has "include" compiler directives at 721 which include the R++-translated version of the class definition 703 main program 719. The main program itself consists of an allocation of a new Rectangle object with length 2 and width 3 and an assignment of the pointer to the new Rectangle object to the Rectangle pointer variable rp. The creation of the new object is a relevant construction, so it triggers update_area rule 715. The values 2 and 3 with which the object was created satisfy the rule's condition, and consequently, the rule fires, setting area to 6. At 725, the << operator is used to output the current values of length, width, and area to standard output; because rule 715 has set area, Rectangle 2,3,6 will appear on standard output. At 727, the modifier function length_set is used to set length to 5; that is a relevant change, so it also triggers rule 715. Again, the condition is satisfied, so the rule fires, setting area to 15; the last statement of main outputs Rectangle 5,3,15 to standard output.

Although this example is very simple, it illustrates three advantages over the alternative method of updating the area from within length_set( ) and the corresponding function for width, width_set( ). First, the update is specified in one place (rule 715) rather than two places (the modifier functions). This eliminates two sources of programming error: error by omission, where the update is accidentally omitted from one modifier, and duplication error, where the update expression is not identical in all places. Second, the rule expresses an explicit invariant that is easy to see and understand by all programmers who may ever need to understand the code. In large software projects, where a given module may be maintained and modified by several people during its life-cycle, improved readability and understandability of code is very important. Third, the use of rule 715 guarantees that the invariant will be enforced, regardless of the order in which events occur and regardless of the procedural flow of the program, provided that all changes are made through modifier functions. This kind of non-procedural guarantee is a great advantage in building robust programs.

FIG. 8 shows how program 701 is compiled. Compilation system 801 contains all of the components of a standard C++ compilation system: a C++ compiler 809 which compiles (either directly or via one or more auxiliary translators) C++ source code into object code 815 which is executable on a specific type of machine. In addition, compilation system 801 contains R++ preprocessor 805. Preprocessor 805 takes files of R++ source code which contain rule declarations and definitions and translates them into C++ source code files 807 in which the rules are expressed as C++ declarations and definitions. C++ source files 807 are then compiled by C++ compiler 809. All of the components indicated by reference number 817 thus serve in the preferred embodiment to translate rules into executable code.

Third Example

FIG. 9

The third example shows how rules may be used for data entry validation and also shows how the C++ friend declaration applies to rules and can be used to give a rule access to members of more than one class of object. FIG. 9 shows code fragment 901 of an R++ program which includes a rule for ensuring that the call waiting or call forwarding services are not enabled for a public pay telephone.

Rule 919's condition 921 checks whether the phone is a pay phone and whether it has either the call waiting or the call forwarding service. If it does, the rule is fired. The statements in action 923 output an error message and reset the variables indicating the classes of service to 0. Rule 919 accesses member variables in two C++ classes, namely Line 903, whose objects are the lines which connect telephones to the local switch, and Phone, whose objects represent the telephones. Line's data members include a pointer, terminating_phone 905 to a Phone object which terminates the line, two Boolean variables, call_waiting 907 and call_forwarding 909, which indicate whether the line represented by the object provides these services, and the rule declaration pay_phone_restrictions 911. Class Phone 913 contains one data member of interest, type 915, whose value indicates the type of the phone. Class 913 further contains a friend declaration 917 for rule 911. The effect of declaration 917 is to make the members of class Phone 913 available to rule 919. Thus, as shown at 921, the condition of rule 919 can reference terminating_phone 905 and the service variables 907 and 909 from class Line 903 and the variable type 915 from Phone and action 923 can reference the service variables from class Line 903. The same result could be obtained by making class Line 903 a friend of class Phone 913. The disadvantage of this latter method is that all the members of class Phone would then become available to all the member functions and rules of class Line.

The bindings in rule 919 establish a path of length 1 between an object of class Line and the object of class Phone pointed to by terminating_phone. The creation of an object of type Line is the only relevant construction for rule 919; the relevant changes are changes in the data members 905, 907, 909, of class Line and data member 915 of class Phone.

In the role of data-entry validation, rules provide three main benefits. First, they make the sanity tests explicit and inspectable rather than being buried in procedural code. Second, since the rules are organized by class, it is easy to see if a given test has been included. Third, R++ guarantees that the rules will be applied, regardless of the order in which objects are created and modified.

Fourth Example

FIG. 10

Code fragment 1001 shows how a function can be used in the condition of a rule. Objects of class Device contain a list of objects of class Alarm; the rule alarm_alert 1003 of class Device fires whenever 3 or more of the alarms on the list have occurred in the last 10 minutes. Condition 1005 of rule 1003 contains only a call to the function threshold_test 1007; when the condition 1005 is evaluated and the function threshold_test 1007 returns a value greater than 0, the rule fires.

In a preferred embodiment, all of the data members which can affect the value which a function invoked from a rule's condition returns must be passed as arguments to the function. The reason for this is that by examining the arguments, the R++ preprocessor can determine which data members require modifier functions. In other embodiments, the preprocessor might examine the code for the function to make that determination.

Fifth Example

FIG. 11

The fifth example shows how rules interact with global variables, that is, variables which are not member data in objects. Code fragment 1101 defines a rule 1107 which is a member of the class Alarm. The rule outputs an error message whenever a data member of the class, severity 1104, exceeds the current value of a global variable severity_threshold 1103 which has C++ file scope, i.e., it is not declared within a class and is therefore not a data member in any class. Because severity_threshold 1103 is not a data member in any class, a change to its value is not a relevant change. Changes to the data member severity 1104 are, however, relevant changes for rule 1107. Creation of an Alarm object is further a relevant construction. Thus, Rule 1107 is not triggered by a change in severity_ threshold, but is triggered by a change in severity or by creation of an Alarm object. The current value of severity_ threshold is of course used in the test. A change in severity_ threshold thus does not trigger the rule but does determine whether it will fire.

Sixth Example

FIG. 12

The sixth example shows an extension to C++ boolean expressions used in R++. There are two such extensions: the universally quantified test and the existentially quantified test. The universally quantified test is true if all of the elements of a set or list satisfy the test; the existentially quantified test is true if any of the elements satisfies the test.

Program fragment 1201 of FIG. 12 shows two class definitions: Alarm 1203, whose objects represent alarms, and Device 1205, whose objects represent devices. Two data members are of interest: severity, which indicates the severity of the alarm, and time, which indicates the time at which the alarm was activated. Device 1205 has data members including a list of pointers to Alarm objects and a set of pointers to dependent Device objects. Rule 1207 fires if all of a Device object's alarms are active with severity == 10. Rule 1211 fires if all of a Device object's dependent Device objects have at least one alarm that has occurred in the last five minutes.

The rule 1207 contains a universally quantified test over the alarms of a device. Universally quantified test 1209 has three parts: a quantifier, all, a binding specification, Alarm *a @ alarms, and a test, { a-> severity == 10}. The quantifier specifies that the quantification is universal, the binding specification indicates what set or list of items is to be tested, and the test specifies the test. Note that for intended operation of rule 1207 the test alarms.length( ) >0 is necessary because a universally-quantified test succeeds if applied to an empty set or list.

The rule 1211 contains in its condition 1213 a test 1215 which is universally quantified over the dependent devices of a device; inside this universal test there is a test 1217 which is existentially quantified over the alarms of each dependent device. Again, existentially-quantified test 1217 has three parts: the quantifier, in this case, exists, the binding specification Alarm *a @ d-> alarms, and the test, { a->time > (clocktime - Duration::minutes(5) 0 }.

The binding used in the quantified tests is called an iterator binding because it iterates over the set or list every time the rule condition is evaluated. The variable to which the values of the set or list are bound, for example, a in quantified test 1209, is called the iterator variable. The scope of its binding is only the test which follows the binding specification and its value is undefined elsewhere. Moreover, branch bindings are not permitted within quantified tests, since there is no logical interpretation of such an expression.

FURTHER CHARACTERISTICS OF RULES

In the following, details concerning a number of further characteristics of rules are provided.

Using Rules with Static Data Members

In C++, a static data member of class C is shared by all objects of class C. In effect, a static data member is like a "global" variable for the class, and is therefore treated the same as a global variable when it appears in a rule condition. Specifically, changes to static data members do not trigger any rules, even when such changes are made through R++ modifier functions. The principle behind global variables and static data members is simple: rules react only to data that is exclusively part of a single monitored object.

The safe way to use a static data members is as a shared constant or as a shared variable whose changes need not trigger any rules. As an example of the latter, a static data member could be used as an on/off switch for low-priority alarm monitoring rules.

Rule Firing Order

Depth-First Forward Chaining: The order in which rules fire in R++ is best summarized as "aggressive depth-first forward chaining". It is "aggressive" in the sense that rules are triggered immediately at the point of relevant change or relevant construction; there is no attempt to allow the code containing the trigger to "complete" (in some sense) before the rule is triggered. As a result of that, "depth-first forward chaining" comes as a natural consequence. Specifically, if rule r1 fires and part of its action triggers rule r2, then control immediately goes to r2 even before r1's action completes. If r2 fires and its action triggers rule r3, then control immediately goes to r3 before r2's action completes. When control finally returns to r2's action part, a subsequent statement in r2's action may trigger yet another rule, again causing forward chaining.

Specific-to-General: When a single event triggers rules in a base class as well as a derived class, the order of evaluation is specific-to-general, i.e., the derived-class rules are evaluated before the base-class rules. (If a derived-class rule overrides a base-class rule, only the derived-class rule is evaluated, as explained later.)

Unspecified Order: When a single event triggers two or more rules that are unrelated through inheritance, the order of evaluation is unspecified, i.e., it depends on the implementation of the R++ compiler. If it is necessary to enforce some execution order among a set of rules, the sequencing should be made explicit in the rule's condition. This will ensure that the set of rules continues to work correctly as the source code changes and as the compiler changes. Also, the intended sequence will be conveyed to other programmers who may follow later.

Comparison to OPS5: An important difference between OPS5 and R++ is that there is no conflict set or conflict resolution strategy in R++. In OPS5 an inference engine continually loops through a 3-stage process of matching, selecting, and executing rules, applying a conflict resolution strategy in the selection phase when more than one rule instantiation is ready. See Brownston, et al., *Programming Expert Systems in OPS5: An Introduction to Rule-based Programming*, Addison-Wesley Publishing, 1985. In R++ there is no central inference engine. Instead, the tasks of triggering, evaluation, and firing are distributed through the C++ code emitted by the R++ compiler, and control passes back and forth between the application's procedural code and its rule code.

Inheritance of Rules

Rules are inherited by derived classes. This means that a rule defined in a base class applies to all instances of derived classes. In the simple inheritance hierarchy shown below, rule r1 of class Mammal will, by inheritance, monitor all instances of class Primate. Rule r2 of Primate will monitor only instances of Primate because no other classes are derived from Primate.

```
class Mammal {
    ...
    rule r1;
};
class Primate : public Mammal {
    ...
    rule r2;
};
```

Overriding of Rules

A rule defined in a derived class will override a rule of the same name in the base class, for instances of the derived class. Instances of the base class that are not instances of the derived class will be monitored by the base class rule. In the simple inheritance hierarchy shown below, rule r3 of class Mammal will not monitor instances of class Primate. Instead, the rule r3 of Primate will monitor instances of Primate.

```
class Mammal {
    ...
    rule r3;
};
class Primate : public Mammal {
    ...
    rule r3;
};
```

Monitoring Non-Class Objects

The rule construct in R++ is built upon and integrated tightly with the C++ class construct. Consequently, rules can monitor class objects only. To monitor a non-class type such as an "int" or a structure, the type must be wrapped within a class and the rules must reference that wrapper class.

Condition Evaluation with Multiple Triggerings: FIG. 13

Because of R++ 's aggressive depth-first forward chaining, it will often happen that a rule is triggered many times before its condition is evaluated. FIG. 13 shows an example of a program fragment 1301 which will result in such behavior. Fragment 1301 contains a class declaration for a class X which has three members: the integer variable unit and two rules: increment 1303 and finished 1305. Each time rule increment fires, it increments unit; when unit is 10 or larger, the rule finished fires and outputs a message.

As can be seen from the above, the creation of an object of class X is a relevant construction for both increment and finished and any change in value of unit is a relevant change for both rules. Thus, when an object of class X is constructed (with unit=0), both rules will be triggered. If increment is evaluated before finished, it will fire, changing unit to 1, which then triggers both rules again. Because of aggressive depth-first forward chaining, increment may fire ten times before rule finished gets evaluated for the first time. However, because there have been 11 triggering events for rule finished (one relevant construction and ten relevant changes), rule finished will be evaluated 11 times.

To prevent finished from firing 11 times, the preferred embodiment specifies that a rule will not fire if the value of a data member mentioned in a test or mentioned in a simple binding is changed after the rule was triggered. (Insertion of a new element into a set- or list-valued data member mentioned in a branch binding will not prevent a rule from firing on previously inserted elements.)

This property of rules in the preferred embodiment is implemented by means of time stamps on the data members, time stamps on elements of multi-valued data members, and time stamps on the evaluations. These time stamps are provided by the modifier and constructor functions. If the time stamp on any data member mentioned in a test or simple binding of the rule's condition is younger than the time stamp on the evaluation, that evaluation terminates. Also, if the time stamp on an element used in a branch binding of the rule's condition is younger than the time stamp on the evaluation, that binding will not be used in any instantiations generated by this evaluation. If there is such a time stamp, it means that the data was changed after triggering and there is thus no point in continuting this evaluation.

IMPLEMENTATION OF RULES

The implementation of rules 405 in the preferred embodiment must perform four tasks:

it must detect triggering events, i.e., relevant constructions and relevant changes;

for each triggering event it must arrange for the condition of each of the affected rules to be evaluated starting at those root objects that can result in rule instantiations that include the object created or changed by the triggering event;

for each evaluation it must generate precisely those instantiations that include the created or changed object; and for each such instantiation it must fire the rule, i.e., execute its action, using the bindings in the instantiation.

In prior-art rule-based programming systems such as OPS5, these tasks are performed with the help of a run-time rule interpretation system which includes a rule interpreter and a decision network. In the rule-based programming system of the preferred embodiment, these tasks are completely integrated into the framework provided by C++ classes and class members and no separate rule interpreter or decision network is required.

Detecting Triggering Events

Triggering events may be relevant constructions or relevant changes. As previously explained, relevant constructions are detected by the constructors for objects whose classes include rule members and relevant changes are detected by modifier functions such as function 514 for data members mentioned in the conditions of rules. As also previously pointed out, all such data members must have modifier functions. (Changes to the data members which are not made through the modifier functions will not trigger rules.)

In the preferred embodiment, R++ preprocessor 805 automatically generates the proper constructors and modifier functions from the C++ class definitions and R++ rule definitions in the source code files 803 which it processes and includes these constructors and functions in the C++ class definitions and C++ member function definitions it outputs. First, R++ preprocessor 805 analyzes the rule declarations and class declarations in source code in files 803 to determine which classes will require constructors to detect relevant constructions and which classes will require destructors which do the clean up required when an object involved in a rule is destroyed. Then R++ preprocessor 805 defines a class with name <class name>_rpp and includes a declaration in class <class name> specifying that class class name> inherits from class <class name>_rpp. The constructor functions are thereby inherited by the class. The constructor functions in a preferred embodiment are inherited to ensure that the constructor function will be executed ahead of any other action associated with creation of an object of the class and that the destructor function will be executed following any other action associated with destruction of an object of the class.

R++ preprocessor 805 similarly analyzes the source code to determine which class data members are mentioned in rule conditions and consequently require modifier functions. Preprocessor 805 generates the necessary modifier functions and adds them to the class declarations.

Finding Root Objects

When a relevant change occurs in a neighbor object, the modifier functions generated by R++ preprocessor 805 must be able to locate the root objects for the rules which are to be triggered as a result of the change. In the preferred embodiment, this is done by means of a set of root pointers for each rule variable of the rule which point from a neighbor object which has a data member in which a relevant change may occur to the the root object(s) of potential instantiations for the rule that involve the neighbor object as a binding for the rule variable. R++ preprocessor 805 generates a declaration for each set of root pointers required in a neighbor object from the class declarations for class <root class name> and <neighbor class name> and places the declaration in <neighbor class name>__rpp, from whence it is inherited by class <neighbor class name>.

The actual root pointers are added to the neighbor objects by an instantiation function which creates an instantiation of the rule. As described above, an instantiation is made by following a path from a root object to neighbor objects as defined in the rule's condition. Whenever the instantiation function performs a binding of a neighbor object to a rule variable for which there is as yet no root pointer for this variable to the root object, the instantiation function adds a pointer to the root object to the set of root pointers for the rule and variable combination. At the same time, the instantiation function adds a back pointer in the root object which points to the newly-added root pointer. The back pointers are used by the destructor function for the root object to ensure that when a root object is destroyed, all root pointers which point to it are removed. When a neighbor object is destroyed, its destructor function similarly uses the root pointers to remove the back pointers pointing to the neighbor object.

With the root pointers, triggering a rule 405 is a simple process. When a modifier function makes a change in a data member in a neighbor object, it locates the root pointers for the data member in the sets of pointers. Each root pointer effectively indicates a root object for the rule, and the modifier function uses the root pointer to invoke the instantiation function.

In an obvious optimization, root pointers are not stored for the this rule variable, as they would only point back to the object itself. Instead of following a this pointer, the instantiation function is simply directly called on the object itself.

Instantiation Functions

R++ preprocessor 805 generates the instantiation functions for a rule from the rule definition and adds them to the class of the rule as member functions. It would be possible to have a single instantiation function: namely, whenever a relevant change or relevant construction triggered a rule, the constructor function or modifier function could simply invoke an instantiation function which made instantiations for all paths. In fact, however, the only paths that are interesting are those which include the data member whose value change caused the rule to be triggered. In a preferred embodiment, the instantiation functions only make instances for those paths.

To achieve this optimization, R++ preprocessor 805 of the preferred embodiment analyzes the input classes to determine what types of paths are required by each rule. It then makes instantiation functions for each rule for the types of paths required by the rule. R++ preprocessor 805 further uses the analysis to determine which of these instantiation functions should be used by a modifier function which modifies a given data member that is mentioned in a rule and includes invocations of the proper instantiation functions in the constructor or modifier function.

FIG. 14 shows how the back pointers, root pointers, modifier functions, and instantiation functions are distributed across the root object and its class and a neighbor object and its class. The figure should be studied with the understanding that many objects are both root objects and neighbor objects, and will contain all of the elements shown in FIG. 14.

Root object 1401 contains data members 1403 defined for its class and inherited back pointers 1405 inherited from the __rpp class for the root object's class. Root class member functions 1407 contains class member functions 1409 and class rules 1411 defined for the root class and additionally contains instantiation functions 1413 for class rules 1411, modifier functions 1415 for modifying data members 1403 which appear in rule conditions, and constructor function 1416 for constructing root object 1401.

Neighbor object 1417 contains the data members 1419 defined for its class and inherited root pointers 1421; neighbor class member functions 1422 includes class member functions 1423 and modifier functions 1425. At 1429, FIG. 14 shows the pointer relationships between neighbor object 1417 and root object 1401. Pointers 1427, represented by solid lines, are the inter-object pointers specified for root object 1417's class; pointers 1421, represented by dashed lines, are the root pointers from neighbor object 1417 to root object 1401; pointers 1405, indicated by dotted lines, are the back pointers from root object 1401.

An Example

Figure 15:
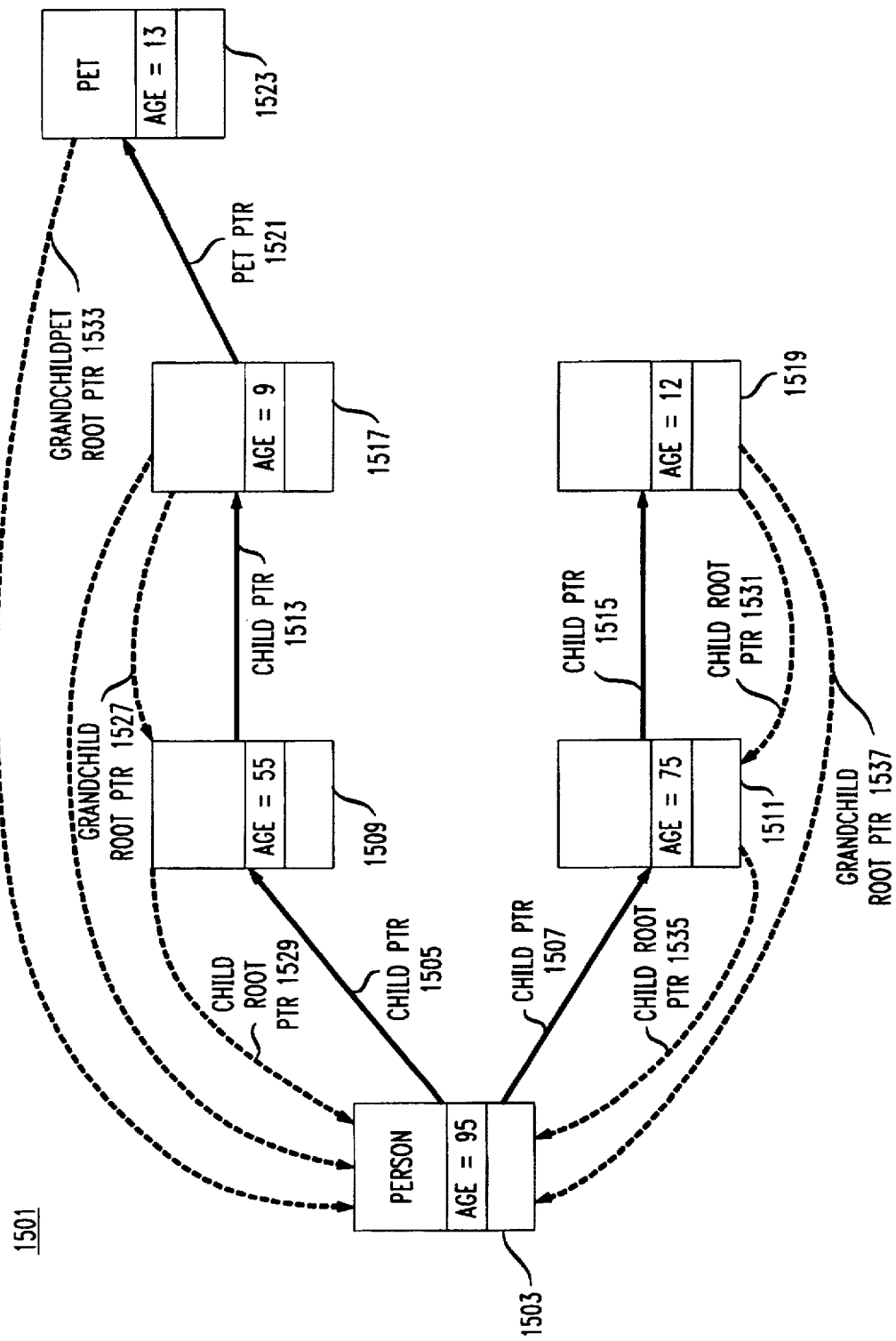
FIG. 15 is a diagram of an example root object with a set of neighbor objects.
Figure 16B:
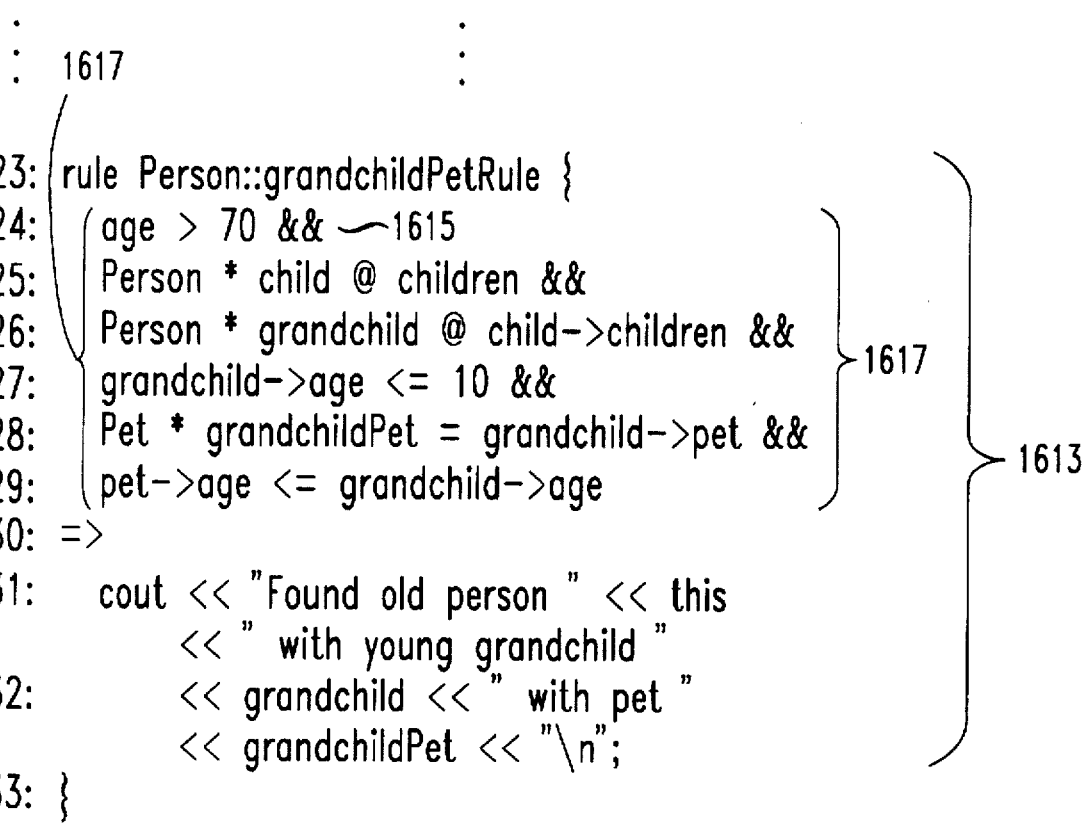
FIG. 16 is the source code for the diagram of FIG. 15.

FIGS. 15 and 16

FIG. 16 shows a set of class definitions which will be used in a simple example which illustrates the above principles. Code fragment 1601 contains declarations for two classes: class Person, which has as its data members a set of pointers children 1605 to other Person objects which represent children of the given Person object, a pointer to a Pet object 1607 representing a pet belonging to the person, and an integer variable age 1609 indicating the age of the person represented by the Person object. There are also a rule declaration for the rule grandchildPetRule 1613 and declarations 1610 for the constructor and destructor for objects of class Person.

At 1611, there is seen the declaration of class Pet. Pet has three data members, name, age, and breed; of these, only age 1605 is interesting for the example. The class constructor and destructor are at 1614.

Rule 1613 is a member rule of Person class 1603. The rule states that an action is to occur if condition 1615 is satisfied. The condition is satisfied when a grandparent who is older than 70 has a grandchild whose age is no greater than 10, the grandchild has a pet, and the age of the pet is no greater than that of the grandchild.

In terms of tests and bindings, the rule first tests whether the data member age in the root object has a value greater than 70; then it binds each pointer in children in turn to the local variable child and for each of those bindings, it binds each pointer in children in the object representing each child of the root object to the local variable grandchild. It then tests whether the grandchild's age data member has a value of 10 or less. If the test succeeds, the pointer to the pet object for the grandchild's pet is bound to the local variable grandchildPet and the age of the pet is compared to the age of the grandchild. If all of the tests and bindings succeed, the action is executed.

The relevant construction for the grandchildPetRule is creation of a new Person object; the relevant changes are the following:

adding a new Person object to the children data member of any Person object;

changing the value of data member 1607 Pet in any Person object;

changing the value of data member 1609 age in any Person object; and changing the value of data member age 1612 in any Pet object.

Since children, pet, age 1609 and age 1612 are all referenced in the condition of rule 1613, each of these data members has been provided with a modifier function by R++ preprocessor 805.

FIG. 15 shows a system 1501 of Person and Pet objects set up by the operations of the preferred embodiment. The system represents a single grandparent with two children, each of which has one child. One of the grandchildren has a pet. The grandparent is represented by Person object 1503, with age 75; the children are represented by Person objects 1509, with age 55, and 1511, with age 75, and are locatable from grandparent object 1503 via child pointers 1505 and 1507. The grandchildren are represented by Person objects 1517, with age 9, and 1519, with age 12, which are locatable by child pointers 1513 and 1515. The grandchild represented by object 1517 has a pet represented by pet object 1523, with age 13, locatable by pet pointer 1521.

As age 1609 in Person object 1503 is greater than 70, Person object 1503 is a child root object for its children, Person objects 1509 and 1511, and a grandchild root object for its grandchildren, Person objects 1517 and 1519. Consequently, there are child root pointers 1529 and 1535 for rule 1613 from Person objects 1509 and 1511 back to Person object 1503, and grandchild root pointers 1572 and 1537 for rule 1613 from Person objects 1517 and 1519 back to Person object 1503. As Person object 1517 has age no greater than 10 and has a pet, there is a grandchildPet pointer 1533 from its Pet object 1523, to Person object 1503.

As age 1609 in Person object 1511 is greater than 70, Person object 1511 is a child root object for its children, Person object 1519, and would be a grandchild root object for its grandchildren, provided that it had any. Consequently, there is a child root pointer 1531 for rule 1613 from Person object 1519 back to Person object 1511.

In general, each Person object which has a parent with age greater than 70 will have a child root pointer for rule 1613 to each object representing one of its parents with age greater than 70; thus object 1509 has a child root pointer 1529 to root 1503 and object 1519 has a child root pointer 1531 to object 1511. The child root pointers are necessary because the addition of a pointer to a Person object's set of children triggers the rule. Further, each Person object representing a person which has a grandparent with age greater than 70 will have a grandchild root pointer to each object representing one of its grandparents with age greater than 70. Thus, in FIG. 15, object 1517 has a grandchild root pointer 1527 to object 1503. Finally each Pet object which belongs to a grandchild with age at most 10 and a grandparent with age over 70 will have grandchildPet root pointers to the Person objects representing the grandchild's grandparents with age over 70. The GrandchildPet root pointer 1533 is such a root pointer in FIG. 15.

The paths defined by the child pointers 1505, 1507, 1513, and 1515 and pet pointer 1521 are traversed from root object 1503 whenever grandchildPetRule is triggered by an event in object 1503 or any of the neighboring objects. If the triggering event occurs in root object 1503, the instantiation functions traverse the paths from the root object, installing root pointers as they go, and fire the rule whenever a traversal satisfies the condition; if the triggering event occurs in a neighboring object, the instantiation functions use the root pointers to locate the root objects for the rules affected by the triggering event and then traverse paths from the root object until the path containing the data member which caused the triggering event has been reached. The instantiation functions then complete the traversal of that path and fire the rule whenever the traversal satisfies the condition. If the data member which caused the triggering event is never reached, the root pointer is removed.

A change in value of age 1609 in a Person object of set of objects 1501 can serve as an example. The modifier function for age 1609 first modifies the age data member 1609 on the triggering Person object. Then, because the age data member 1609 of the this variable is mentioned in the condition of rule 1603, the modifier function invokes an instantiation function treating the changed Person object as a root object for rule 1603. This instantiation function is responsible for evaluating the condition of rule 1603, and thus follows the paths specified therein. In FIG. 15, for example, this first instantiation function, in response to a change to the age of Person object 1503 will traverse the path made by pointers 1505, 1513, and 1521, installing root pointers 1527, 1529, 1531, and 1533 as it goes. If the bindings on the path satisfy the condition, the rule will fire. The first instantiation will do the same with the path made by pointers 1507 and 1515, again root pointers as necessary. Since there is no Pet object for object 1519, the traversal will not complete. After having gotten as far as it can in the traversal (including firing the rule) the first instantiation function returns.

Then, because the age data member 1609 of the grandchild variable is mentioned in the condition of rule 1603, the modifier function invokes a second instantiation function treating the changed Person object as a grandchild object for rule 1603. This instantiation function uses the grandchild root pointers for the changed object to find the correct root object on which to start the evaluation of rule 1603. If there are no such root pointers, the object is an object with no grandparent of age over 70 and the second instantiation function simply returns. If there are grandchild root pointers, the second instantiation function invokes a third instantiation function for each grandchild root pointer. The third instantiation function is invoked using the grandchild root pointer and is further provided with a pointer to the object in which the change to the age data member occurred. The third instantiation function thus starts from a root object and has access to the grandchild object in which the change occurred. The third instantiation function traverses paths from the root object until it traverses a path which reaches the Person object in which the change occurred as a binding for the path's grandchild rule variable. It then continues on only these paths to any pet of the grandchild, installing any grandchild pet root pointer which may be required in the Pet object. It abandons paths that do not reach the grandchild object in which the change occurred. In traversing the path, the third instantiation function makes the tests specified in the rule; if the entire condition is satisfied, the rule fires.

Applying the above to FIG. 15, when age 1609 is changed in object 1517, the first instantiation function not find any children of object 1517 and will return. The modifier function will then invoke the second instantiation function. Since there is a grandchild pet root pointer, namely one to object 1503, the the second instantiation function will invoke the third instantiation function with a pointer to object 1503, as the root object, and a pointer to object 1517, as the grandchild object. The third instantiation function will follow child pointers 1505 and 1513 until it reaches object 1517. Since that is the object that it has a grandchild pointer for, it will follow pet pointer 1521 to pet object 1523, install grandchildPet root pointer 1533 if necessary, and perform the comparison of the pet's age and the child's age required by the rule. The third instantiation function will follow child pointers 1507 and 1515 to reach object 1519, but abandons this path because the wrong grandchild has been reached.

As may be seen from the foregoing, the algorithm just described ensures that all neighbor objects of a given root object have the root pointers required for the rule and that a relevant change in a neighbor object causes the rule's path to be traversed only to the extent required to traverse the part of the path which contains the object in which the relevant change occurred.

Example of Operation of R++ Preprocessor 805

FIGS. 17-20

The following example of the operation of R++ preprocessor 805 takes the declarations of class Pet and class Person from FIG. 16 and shows how preprocessor 805 adds data members and member functions to the classes as required for their member rules. FIG. 17 shows the expanded declarations 1701 for the classes Pet and Person produced by preprocessor 805 from the declarations of FIG. 16. The members from the original declaration of Pet appear at 1723 and the members from the original declaration of Person appear at 1705. The new material in Pet includes an inheritance declaration 1725 for an inherited class Pet_rpp, which includes the declarations for the sets of root pointers and back pointers and the constructors and destructors required because of the rule. Declaration 1727 is a friend declaration; preprocessor 805 inserts the friend declarations which are required to provide the access needed to evaluate a rule. Declaration 1729 declares an instantiation function for Pet; because Pet objects cannot be root objects for rule 1613, the instantiation function is one of the second type which follows the root pointer and then invokes an instantiation function of the third type which does the traversal from the root object. The function's name is produced by preprocessor 805 from the name of the class of the rule, the name of rule, the name of the rule variable(s) that are monitored, and a tag indicating whether the function follows root pointers (_revisit), is invoked after a root pointer has been followed (_restart_<relevant change>), or is simply invoked as a result of a change in the root (_restart).

The additions to Person are similar; the Person_rpp class is inherited at 1709; there is a friend declaration for instantiation function 1729 at 1711; the instantiation functions for Person are at 1713. The _start function 1715 is invoked by the constructor for objects of class Person; in the preferred embodiment, it simply invokes the _restart instantiation function. There are _revisit functions for the kinds of neighbor objects which have root pointers and _restart_ <relevant change> functions for the relevant changes which can occur in neighbor objects. Three of these instantiation functions, _restart 1717, _restart_given_grandchild 1719, and _grandchild_revisit 1721 come into play when a value of age 1609 changes and will be discussed in more detail below.

At 1707, finally, are found the modifier functions for class Person. The modifier functions children_insert and children_remove add and remove pointers from the children set, pet_set sets the pet data member, and age_set sets the age data member. Preprocessor 805 generates such a modifier function for every data member of a class which is mentioned in a rule.

FIG. 18 shows the _rpp classes 1801 generated by preprocessor 805 for inheritance by Pet and Person. Person_rpp contains the declarations 1803 for the sets of root pointers (at 1807) and back pointers (at 1805) which a Person object contains because of rule 1613. The name of each root pointer specifies the rule name and the relationship between the neighbor object it comes from and the root object. The names of the sets of the back pointer are based on the names of the corresponding sets of root pointers. There are more sets of back pointers than root pointers because there are back pointers to Pet objects as well as Person objects. Also declared at 1809 are constructors and destructors for Person_rpp objects. The constructor does nothing and the destructor removes root and back pointers as required when a Person object is destroyed.

Pet_pp class 1810 is similar, except that here, only one set of root pointers 1811, from the Pet object to the grandparent object, is needed.

FIGS. 19 and 20 show the age_set modifier member function 1901 created by preprocessor 805 to handle modifications of age data member 1609 and the instantiation functions which are executed when such a modification occurs in a Person object. Beginning with age_set modifier function 1901, the part labeled 1903 performs an assignment to age in the local object (indicated by this->age) only if the new value of age is different from the current value, i.e., only if a relevant change has occurred. The instantiation functions invoked at 1905 and 1907 are also only invoked in the case of a relevant change. The first invocation, _restart 1905, invokes an instantiation function of the first kind, i.e., one which treats the object from which it is invoked as the root object and returns after it has done as many tests and bindings as possible; the second invocation, _revisit 1907, invokes an instantiation function of the second kind, i.e., one which follows any root pointers for the rule in the object from which it is invoked and invokes an instantiation function of the third kind in the root objects specified by the root pointers. The integer values used as arguments represent Boolean values used to prevent multiple firings of rules when paths form loops.

The _restart function invoked by age_set is shown at 1909. The formal arguments 1911 specify whether function 1909 has to monitor and abort loops from the root binding to the child binding, to the grandchild binding, and to the grandchildPet binding. age_set 1901 invokes it with the arguments set to indicate that only loops to the grandchild binding need be monitored, because only at grandchild is data member age also mentioned for a class related to root class. The general principle of operation of function 1909 is that the function performs tests and bindings in the order specified in the rule's condition and continues until either a test or binding fails or the rule's action is executed.

At 1913, function 1909 tests the age, since if it is not greater than 70, the first test will not succeed and there is no need to continue the traversal. At 1915, the function visits each child of the root object and adds any necessary root pointers and back pointers (1917). If the root object has any grandchild objects, the function does the same with the grandchild objects (1919). As shown at 1921, if the function finds a grandchild where age is less than 10, it follows any pet pointer to the Pet object, again adding any necessary root pointers and back pointers. Having done this, the function compares the values of the age data members in the grandchild object and the pet object and executes action 1922 if the age of the pet is no greater than the age of the grandchild.

The __revisit function invoked by age__set is shown at 2001. The single formal argument indicates whether it has to monitor loops from the grandchild binding to the grandchildPet binding. Because Pet and Person do not inherit from one another, invocation 1907 sets the argument to 0. The function then follows each root pointer for the rule to a root object for the rule; for each root pointer, it invokes the __restart__given__grandchild function at the root object using a pointer to the current object and its loop monitoring argument. If the __restart__given__grandchild function returns 0, the traversal performed by that function did not find the current object, and __revisit removes the grandchild root pointer.

The restart__given__grandchild function is shown at 2003. The function has two formal arguments, one being a pointer to a grandchild object and the other being a loop monitoring argument as for the member function 2001. The function is invoked on a root object and operates on the same principle as the __restart function, namely, it performs the tests and bindings specified by the rule in order until a test or binding fails. If none fails, it executes the rule's action. Thus, as shown at 2005, it begins its traversal of the path by testing the root object's age; if the test succeeds, the function follows each child pointer in the root object in turn until it finds a child whose children set includes the grandchild object whose pointer was received as an actual argument. When the child is found, reached is set to 1. If no child is found, its value remains 0. The section of the function labeled 2007 tests the child's age, and if it is less than 10, follows any pet pointer to the Pet object. There, it adds any required root pointer to the Pet object's set of root pointers and any required back pointer to the root object's set of back pointers (2009). Finally, it tests the ages of the grandchild and its pet and if the test succeeds, the rule's action is executed (2011). reached is returned to indicate whether the function found the grandchild object.

As can be seen from FIGS. 17–20, R++ preprocessor 805 is able to obtain all of the information necessary to generate the expanded class definitions, the root and back pointer set definitions, and the definitions of the constructors, destructors, modifier functions, and instantiation functions from the class definitions shown at FIG. 16. Further, the constructors, destructors, modifier functions, and instantiation functions produced by preprocessor 805 are able to perform all operations necessary to test and fire a rule without reference to a decision net or rule interpreter external to the root and neighbor objects for the rule.

As should also be apparent from FIGS. 17–20, the principles illustrated with regard to the simple example of FIG. 16 are equally applicable to examples with many rules involving many classes of objects and complex relationships between objects. For example, the instantiation functions are able to handle the situation where a Person object is both a parent and a grandchild, i.e., has both parent and grandparent objects, or where a Person object is its own child or grandchild.

Detailed Implementation Method

The following detailed implementation method explains the algorithms used in a preferred embodiment of preprocessor 805 to produce the modifications to the classes input to preprocessor 805 and to produce the __rpp classes.

0. Rule parent class

For each class [c] used in a rule:

(a) Create a class [c]__rpp and make it a parent of [c].

(b) Create a null constructor for [c]__rpp.

1. Basic root class changes:

For each rule [r] with root class [c]:

(a) Add to [c] a member function [c]__[r]__start to evaluate [r]. This function runs the tests and bindings in order, adding root pointers as necessary, continuing only on successful tests and bindings, and when at the end, runs the consequent. [The preferred embodiment currently just calls the restart function in 2.a with no binding checks.]

(b) For any user-written constructors of [c], add call to [c]__[r]__start at end. [Done manually in the preferred embodiment, by calling rpp__start( ).]

(c) If constructor with no args ([c]::[c]( )) does not exist, then create it to contain call to [c]__[r]. [Not done in the preferred embodiment.]

2. Restart functions:

For each rule [r] with root class [c]:

(a) Restart for changes to relevant fields of the root object: Add to [c] a member function [c]__[r]__restart to restart [r] with no extra bindings. This function takes boolean arguments that determine which bindings to check (one argument for each binding in the rule). It runs the tests and bindings of the rule in order, branching as it goes, adding root pointers as necessary, continuing only on successful tests and bindings. For each binding that is being checked the function continues only for values that are different from the root object. If the function gets to the end of the LHS of the rule, it runs the consequent.

(b) Restarts for changes to relevant fields for [vi]: For each variable [vi] of [r] add to [c] a member function [c]__[r]__restart__given__[vi] to restart [r] with a given value for [vi]. This function takes one argument for the binding of [vi] and boolean arguments that determine which of the variables after [vi] need to be checked. It runs the tests and bindings in order, as in 2.a above, except that it only adds root pointers after the binding for [vi] has been reached. It abandons all bindings for [vi] that are not the given value. Also, it only checks for different objects on bindings after [vi] and checks against the given value for [vi]. When the function gets to the end of the LHS of the rule, it runs the consequent. The function returns a boolean value that indicates whether a path from the root back to the given value for [vi] was reached.

(c) Restarts when adding new members to branch bindings from "this" (case 3): For each variable [vb] branch defined via [dmb] (on "this") add to [c] a member function [c]__[r]__restart__new__[vb] to restart [r] with a new value for [vb]. This function takes one argument for the binding of [vb]. It runs the tests and bindings in order, as in 2.a above, except that it only adds root pointers after the binding for [vb] has been reached. It abandons all bindings for [vb] that are different from the given value. For each [vk] that uses [dm], except in a branch binding, only bindings for [vk] that are the different from the root binding are continued. For each branch binding that is defined as [cj]*[vj]@[vxj]->[dm] (or just [dm]), for j>b, continue only if the root object is different from the binding for [vxj] or the binding value for [vb] is different from the binding for [vj]. When the function gets to the end of the LHS of the rule, it runs the consequent.

(d) Restarts when adding new members to other branch bindings (case 1): For each variable [vb] branch defined via [vxb]->[dm] add to [c] a member function [c]__[r]__restart__given__[vxb]__new__[vb] to restart [r] with a given value for [vxb] and a new value for [vb]. This function takes one argument for the binding of [vxb] and one for the binding of [vb]. It runs the tests and bindings in order, as in 2.a above, except that it only adds root pointers after the binding for [vb] has been reached. It abandons all bindings for [vxb] that are different from its given value. It abandons all bindings for [vb] that are different from its given value. For each [vk], k>xb, that uses [dm], except in a branch binding, only bindings for [vk] that are the different from the binding for [vxb] are continued. For each binding that is defined as [ck]*|vk]@[vxk]->[dm] (or just [dm]), for k>b, continue only if the binding for [vxb] object is different from the binding for [vxk] or the binding value for [vb] is different from the binding for [vk]. When the function gets to the end of the LHS of the rule, it runs the consequent. The function returns a boolean value that indicates whether a path from the root back to the given value for [vxb] was reached.

3. Non-root data members and member functions:

For every class [ci] used as the type of a rule variable [vi] in rule [r] with root class [c]:

(a) Root and reverse root pointers:

i. Add to [ci]__rpp a data member [c]__[r]__[vi]__roots of type Set__of__p<[c]> that will hold the roots for [vi] of [r].

ii. Add to [c]__rpp a data member [c]__[r]__[vi]__r__roots of type Set__of__p<[ci]> that will hold the reverse roots for [vi] of [r].

iii. In the deletion function for [ci]__rpp remove all the reverse root pointers that are inverses of the [r] [vi] reverse roots. The deletion function for sets will take care of reclaiming the roots set.

iv. In the deletion function for [c]__rpp remove all the root pointers that are inverses of the [r] [vi] reverse roots. The deletion function for sets will take care of reclaiming the reverse roots set.

(b) Member function to initiate restarts for [vi]: Add a member function [c]__[r]__[vi]__revisit to [ci] to restart [r] with [vi] bound. This function, for each root pointer for [vi] of [r], calls the [vi] restart member (2.b) of the root with this object. If the return value of the restart function is false, the function removes this root pointer.

(c) Member function to initiate restarts for case 1 bindings: If the class is used in the branch binding of [vb], add a member function [c]__[r]__[vi]__[vb]__revisit to restart [r] with [vi] bound and a new [vb]. This function takes one argument, which is the new binding for [vb]. For each root pointer for [vi] of [r], it calls the [vi] [vb] restart member (2.d) of the root with this object as the binding for [vi] and its argument as the binding for [vb]. If the return value of the restart function is false, the function removes this root pointer.

4. Interface to C++:

(a) Non-branch-binding access: For each non-branch-binding access [dm] ([vi]->[dm]) in the left-hand-side of [r], create or modify the [dm]__set, [dm]__insert, [dm]__remove, [dm]__put, [dm]__unput, [dm]__get, or [dm] unget member functions of [c] ([ci]) as follows. If the call really results in a change, restart the rule on the changed object (revisit the rule from the changed object) checking bindings of following [vk]s that have a [vk]->[dm] access.

(b) Branch-binding access: For each binding access [dm] (case 3 defs) ([vxb]->[dm] (case 1 defs)) with no non-binding accesses of the same field in the left-hand-side of [r], create or modify the [dm]__set, [dm]__insert, [dm]__put, or [dm]__unget member functions of [c] ([ci]) as follows. If the call really results in a change, restart the rule on the changed object (revisit the rule from changed object) with [vb] bound to the new value.

All of the above being the case, the foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the law.

What is claimed is:

1. An apparatus implemented in a computer system for producing executable code for a system wherein a rule responds to a change in data belonging to the system, the apparatus comprising:

a rule definition stored in the computer system as at least one member of a class having path-based rules, the rule definition for specifying a collection of data structures in which the change occurs; and code generation means responsive to the rule definition for producing executable code associated with the data structures, wherein the executable code is an implementation of the rule and includes one or more instantiation functions which execute in response to the change and a triggering function which detects the change and invokes the instantiation function.

2. The apparatus set forth in claim 1 wherein:

the change is creating a data structure belonging to the collection.

3. The apparatus set forth in claim 1 wherein:

the change is a change in a value in a data structure belonging to the collection.

4. The apparatus set forth in claim 1 wherein:

the rule definition comprises a condition specifier which specifies a condition involving the data structures in the collection and an action specifier which specifies an action to be executed when the condition is satisfied; and the instantiation function responds to the triggering function by evaluating the condition and executing the action when the condition is satisfied.

5. The apparatus set forth in claim 4 wherein:

the data structures in the collection include at least a root data structure from which the instantiation function begins evaluating the condition.

6. The apparatus set forth in claim 5 wherein:

the data structures in the collection further includes a neighbor data structure which is accessible from the root data structure and which is mentioned in the condition specifier; and the instantiation function continues evaluating the condition using the neighbor data structure.

7. The apparatus set forth in claim 6 wherein:

there is at least one set of the neighbor data structures;

the condition includes a local variable;

the instantiation function evaluates the condition by binding the local variable in turn to as many of the neighbor data structures in the set as are required for evaluation.

8. The apparatus set forth in claim 7 wherein:

the condition further includes a quantifier which operates on the local variable; and the instantiation function binds the local variable to the neighbor data structures as required by the quantifier.

9. The apparatus set forth in claim 8 wherein:

the quantifier is in the alternative a universal quantifier and an existential quantifier.

10. The apparatus set forth in claim 6 wherein:

the instantiation function evaluates the condition using only the root data structure and any neighbor data structure.

11. The apparatus set forth in claim 6 wherein:

the executable code includes code which establishes a set of root pointers in the neighbor data structure; and when evaluating the condition using the neighbor data structure, the instantiation function adds any necessary root pointer to the root data structure to the set of root pointers.

12. The apparatus set forth in claim 11 wherein:

when the change is in the neighbor data structure, the instantiation function follows the root pointer to the root data structure.

13. The apparatus set forth in claim 6 wherein:

there is a plurality of the neighbor data structures; and when the change is in one of the neighbor data structures, the instantiation function evaluates the condition only until the condition has been evaluated for the neighbor data structure in which the change occurred.

14. The apparatus set forth in any of claims 1 through 13 wherein:

the data structures in the collection are defined as objects belonging to at least one class; and the apparatus further includes a class definition for the class stored in the computer system; and the code generation means is further responsive to the class definition and defines the executable code as code for at least one additional member of the class definition.

15. The apparatus set forth in claim 14 wherein:

the code generation means produces the additional member using substantially nothing but the rule definition and the class definition.

16. The apparatus set forth in claim 14 wherein:

the rule definition defines the rule as a member of the class.

17. The apparatus set forth in claim 16 wherein:

the rule and the additional member are inherited and may be redefined in the same fashion as other members of the class.

18. The apparatus set forth in claim 14 wherein:

the class is the class of the root object.

19. An apparatus implemented in a computer system for producing executable code for a system wherein a rule responds to a change in data belonging to the system, the apparatus comprising:

a rule definition stored in the computer system which specifies a collection of data structures in which the change occurs; and code generation means responsive to the rule definition for producing executable code associated with the data structures, wherein the executed code is an implementation of the rule and is based solely on a rule-definition code and an object-oriented code and includes one or more instantiation functions which execute in response to the change and a triggering function which detects the change and invokes the instantiation function.

20. An apparatus implemented in a computer system for producing executable code for a system wherein a rule responds to a change in data belonging to the system, the apparatus comprising:

a rule definition stored in the computer system which specifies a collection of data structures in which the change occurs; and code generation means responsive to the rule definition for producing executable code associated with the data structures, wherein the executable code is an implementation of the rule and includes executable code for at least one instantiation function which executes in response to the change and executable code for a triggering function which detects the change and invokes the at least one instantiation function, and said triggering function and said at least one instantiation function are embedded solely in a rule-definition code and an object-oriented code.

* * * * *